United States Patent
Höchsmann et al.

(10) Patent No.: US 10,695,954 B2
(45) Date of Patent: Jun. 30, 2020

(54) COATER ARRANGEMENT FOR A 3D PRINTER AND METHOD FOR APPLYING TWO LAYERS OF PARTICLE-SHAPED CONSTRUCTION MATERIAL

(71) Applicant: ExOne GmbH, Gersthofen (DE)

(72) Inventors: Rainer Höchsmann, Langenneufnach (DE); Alexander Müller, Diedorf-Vogelsang (DE); Sven Klaua, Augsburg (DE)

(73) Assignee: ExOne GmbH, Gersthofen (DE)

( * ) Notice: Subject to any disclaimer, the term of this patent is extended or adjusted under 35 U.S.C. 154(b) by 440 days.

(21) Appl. No.: 15/506,418

(22) PCT Filed: Aug. 25, 2015

(86) PCT No.: PCT/EP2015/069448
§ 371 (c)(1),
(2) Date: Jul. 26, 2017

(87) PCT Pub. No.: WO2016/030375
PCT Pub. Date: Mar. 3, 2016

(65) Prior Publication Data
US 2017/0361500 A1    Dec. 21, 2017

(30) Foreign Application Priority Data

Aug. 29, 2014    (DE) ........................ 10 2014 112 469

(51) Int. Cl.
*B29C 31/02*    (2006.01)
*B29C 64/20*    (2017.01)
(Continued)

(52) U.S. Cl.
CPC .............. *B29C 31/02* (2013.01); *B29C 64/20* (2017.08); *B29C 64/25* (2017.08);
(Continued)

(58) Field of Classification Search
CPC ... B29C 64/188; B29C 64/329; B29C 64/165; B29C 64/209; B29C 64/20; B29C 64/25; B29C 31/02
See application file for complete search history.

(56) References Cited

U.S. PATENT DOCUMENTS

| 5,647,931 A | 7/1997 | Retallick et al. |
| 6,764,636 B1 | 7/2004 | Allanic et al. |

(Continued)

FOREIGN PATENT DOCUMENTS

| JP | 2006205456 A | 8/2006 |
| JP | 5408151 B2 | 2/2014 |
| WO | 2011067301 A1 | 6/2011 |

*Primary Examiner* — Nahida Sultana
(74) *Attorney, Agent, or Firm* — Philip Lane

(57) ABSTRACT

A coating device arrangement 1 for a 3D printer is disclosed, comprising a coating device 3 having a container 17 defining an inner cavity for receiving particulate construction material which leads to an opening for outputting the particulate construction material, and a stroking member 15*a*, by which a stroking surface is formed which is directed downward, and which is configured to stroke over construction material output from the opening using the stroking surface to thereby level and/or compress the output particulate material. The coating device arrangement 1 further comprises a setting device 13 which is configured to variably set an inclination angle of the stroking surface 15*a*.

20 Claims, 16 Drawing Sheets

(51) Int. Cl.
    *B29C 64/25*         (2017.01)
    *B29C 64/153*      (2017.01)
    *B29C 64/165*      (2017.01)
    *B33Y 40/00*       (2020.01)
    *B33Y 30/00*       (2015.01)
    *B29C 64/209*      (2017.01)
    *B22F 3/105*       (2006.01)

(52) U.S. Cl.
    CPC ..... *B22F 2003/1059* (2013.01); *B29C 64/153* (2017.08); *B29C 64/165* (2017.08); *B29C 64/209* (2017.08); *B33Y 30/00* (2014.12); *B33Y 40/00* (2014.12)

(56) References Cited

U.S. PATENT DOCUMENTS

| | | | |
|---|---|---|---|
| 7,931,462 B2* | 4/2011 | Mattes | B29C 64/153 425/375 |
| 2003/0059492 A1 | 3/2003 | Gaillard et al. | |
| 2004/0170765 A1 | 9/2004 | Ederer et al. | |
| 2006/0105102 A1* | 5/2006 | Hochsmann | B05D 1/26 427/180 |
| 2008/0241404 A1 | 10/2008 | Allaman et al. | |
| 2009/0045553 A1 | 2/2009 | Weidinger et al. | |
| 2013/0078325 A1 | 3/2013 | Sperry et al. | |
| 2017/0341303 A1* | 11/2017 | Hochsmann | B22F 3/1055 |

* cited by examiner

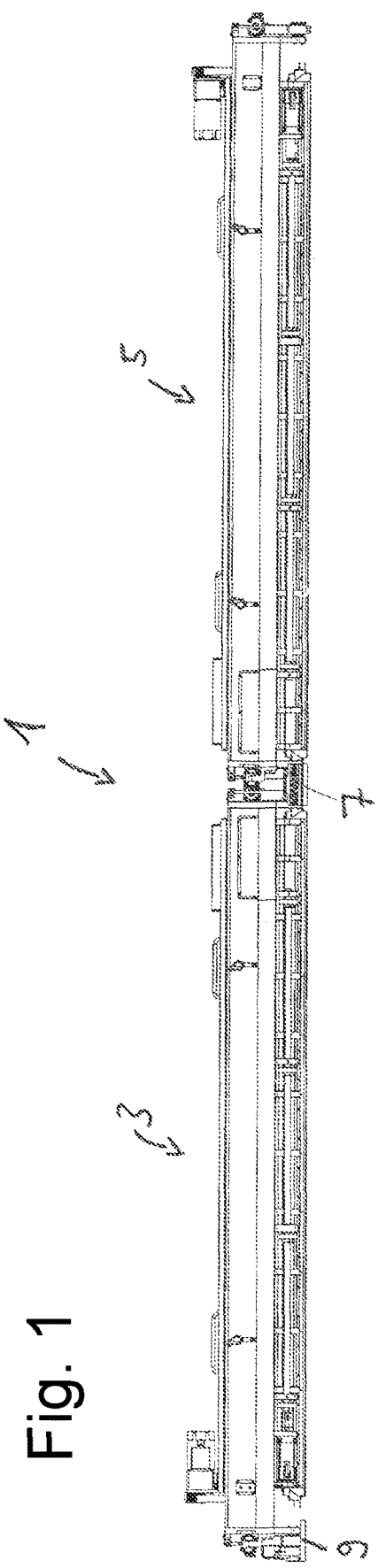

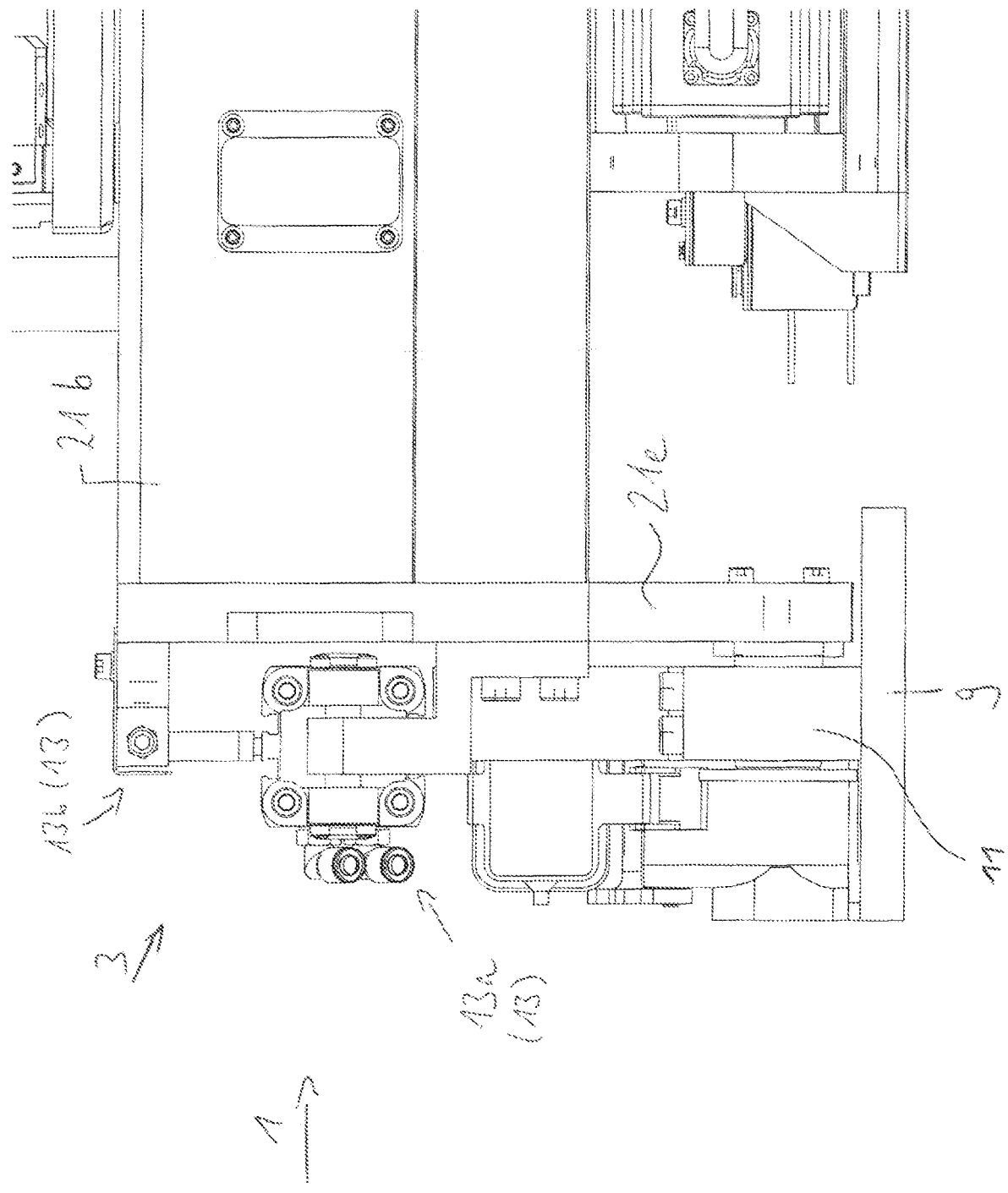

closing device open closing device closed

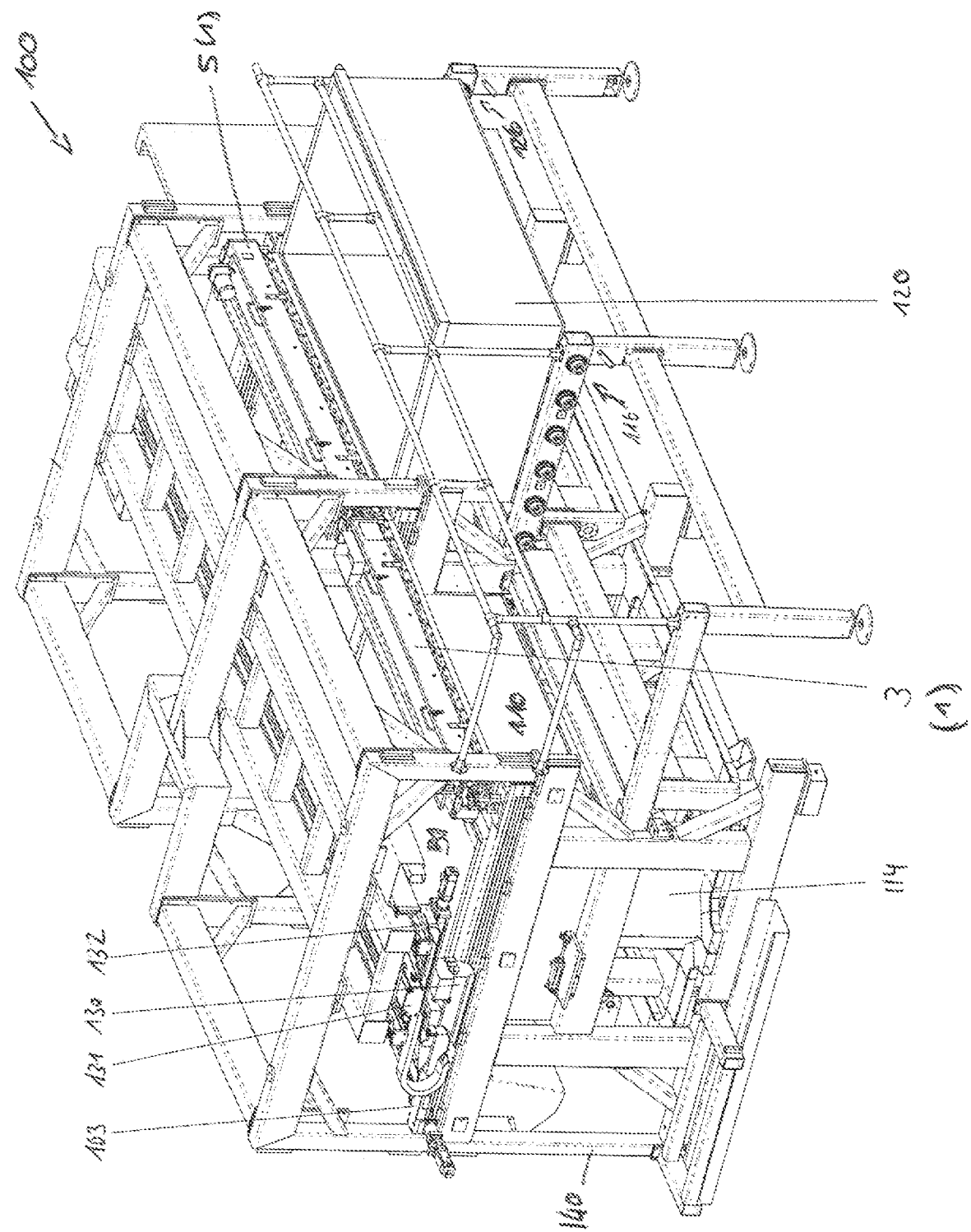

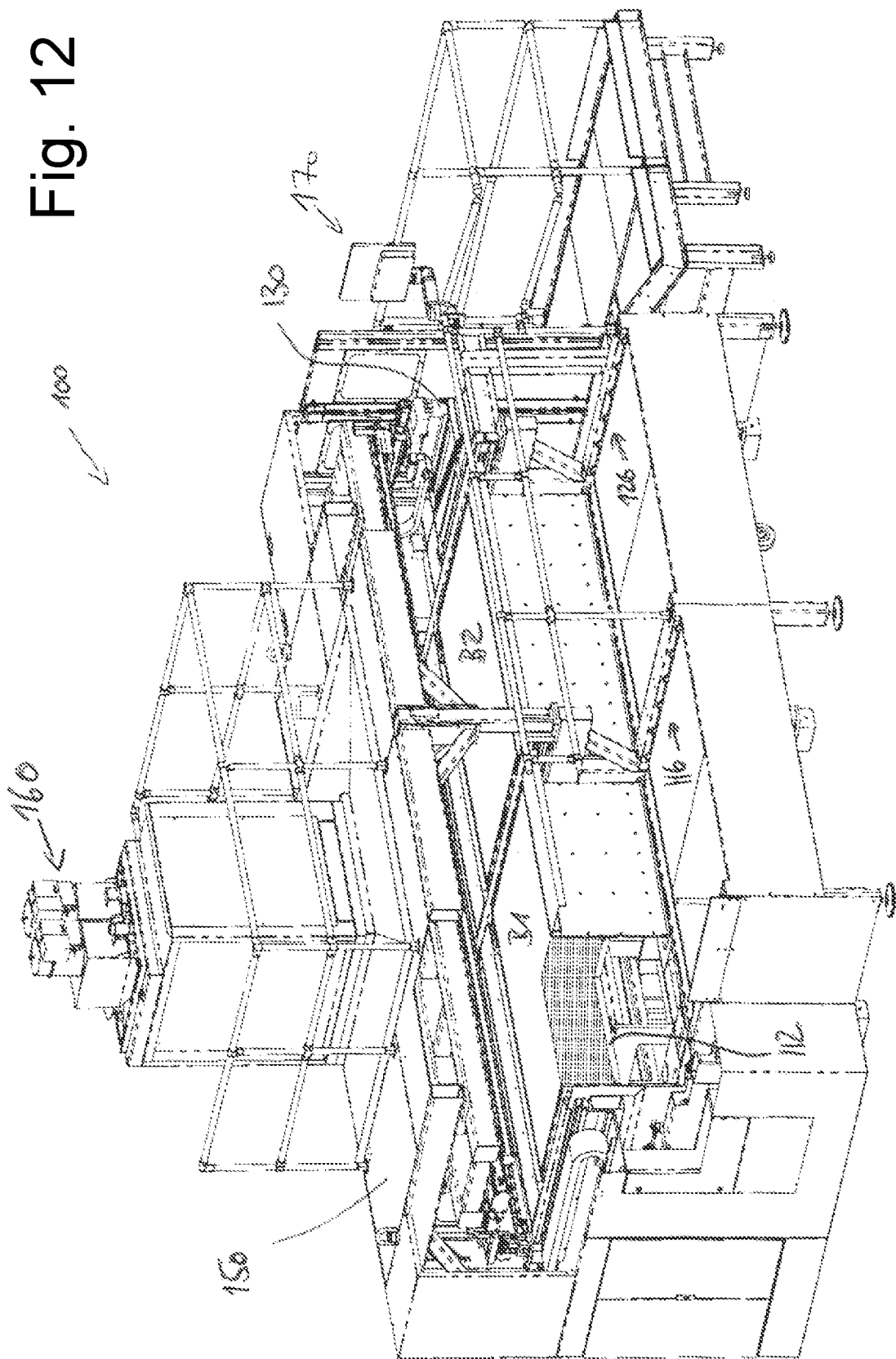

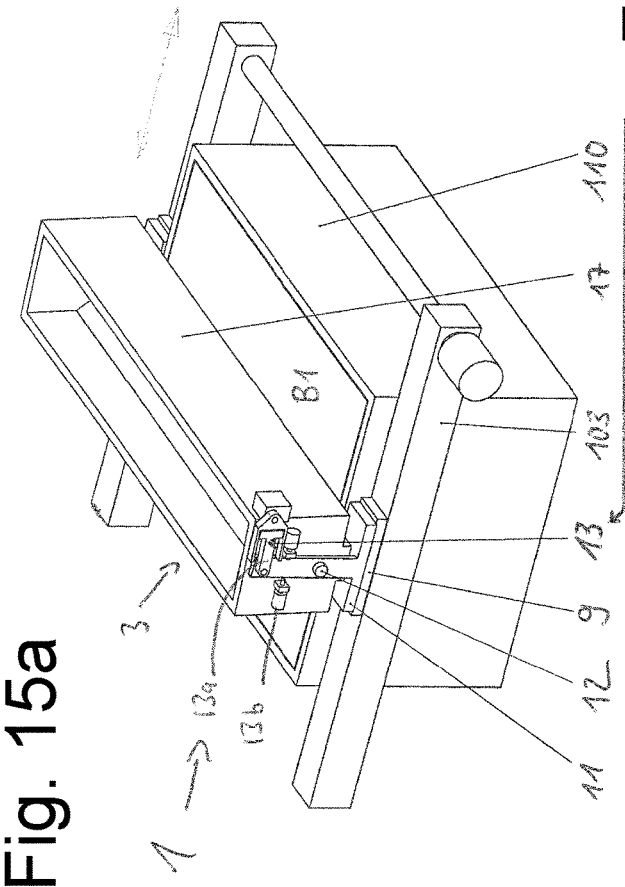

COATER ARRANGEMENT FOR A 3D PRINTER AND METHOD FOR APPLYING TWO LAYERS OF PARTICLE-SHAPED CONSTRUCTION MATERIAL

The present invention relates to a coating device arrangement for a 3D printer, a 3D printer having such a coating device arrangement, and a method for applying two layers of a particulate construction material.

Various generative manufacturing processes (and consequently various types of 3D printers) are known.

Some generative manufacturing processes have the following steps in common:

(1) First, particulate material is applied over the entire surface of a construction field, so as to form a layer of unsolidified particulate material.

(2) The applied layer of unsolidified particulate material is selectively solidified in a predetermined partial area, for example by selectively printing a treatment agent, for example a binder (alternatively, for example, by laser sintering).

(3) Steps (1) and (2) are repeated to manufacture a desired component. For this purpose, a construction platform on which the component is built up in layers may, for example, be lowered by respectively one layer thickness before a new layer is applied over the entire surface (alternatively, the coating device and the printing device may, for example, be raised by respectively one layer thickness).

(4) Finally, the manufactured component which is supported and surrounded by loose, unsolidified particulate material may be unpacked.

The construction space in which the component or the components is/are manufactured may, for example, be defined by a so-called construction box (also referred to as "job box"). A construction box of this type may have a circumferential wall structure which is open in an upward direction and extends in a vertical direction (for example formed by four vertical side walls), which may, for example, be formed to be rectangular when viewed from above. A height-adjustable construction platform may be received in the construction box. In this respect, the space above the construction platform and between the vertical circumferential wall structure may for example at least contribute to forming the construction space. An upper area of the construction space may, for example, be referred to as construction field. An example of such a construction box is, for example, described in DE 10 2009 056 696 A1.

A coating device arrangement having a coating device (also referred to as a "recoater") is normally used in the above step (1). Various coating device arrangements are known for use in 3D printers, by means of which a particulate construction material may be applied to the construction field (also referred to as construction surface or construction area) in the form of an even layer over the entire surface.

One type of coating device arrangement uses a roller (short: "roller coating device") in front of which first an amount of particulate construction material is put down and which is then horizontally moved across the construction field to apply the particulate construction material in the form of an even layer onto the construction field. In this respect, the roller may be rotated opposite to the running direction. Coating device arrangements with great lengths are difficult to realize using a roller coating device.

A similar kind of coating device arrangement uses an oscillating blade instead of a roller. For example, DE 10117875 C1 discloses a method where particulate material is put down in front of the oscillating blade and the particulate material is subsequently applied to an area to be coated by means of the oscillating blade which oscillates in the way of a rotational or pivoting movement.

Another kind of coating device arrangement (a so-called coating device arrangement having a "container coating device", for example a "slot coating device") uses a coating device with a container which is, for example, displaceable across a construction field and defines an inner cavity for receiving particulate construction material which leads to an opening for outputting the particulate construction material onto the construction field. The coating device may be elongate, for example to span or to cover the length or width of a rectangular construction field. The opening may then be provided as a longitudinal slot. The coating device can thus be moved horizontally across the construction field and at the same time output particulate construction material from the opening onto the construction field to thereby apply an even layer over the entire surface of the construction field.

In the above step (2), a printing device having a print head may for example be used, which applies a treatment agent in a controlled way onto a subarea of the construction material layer applied before. The treatment agent contributes to an (immediate and/or subsequent) solidification of the construction material layer in the subarea. For example, the treatment agent may be a binder, for example a binder component of a multicomponent binder.

Alternatively, a laser may, for example, be used in the above step (2) to solidify a subarea of the construction material layer applied previously, for example by sintering or melting the construction material in the subarea.

The present invention relates to a coating device arrangement of the second type, briefly a coating device arrangement having a "container coating device", for example a "slot coating device".

Coating devices of this type may, for example, be provided with a vibration device by means of which the particulate material may be vibrated to influence, for example to support, the flow or trickle behavior of the particulate construction material or the discharge of the particulate construction material from the opening. A vibration device of this type may, for example, be formed by a shaking device by means of which at least a wall portion of the container is vibrated or exposed to a shaking motion to influence the discharge of the particulate construction material.

In addition, coating device arrangements of this type may, for example, be provided with a labyrinth structure inside the container, which may prevent the construction material from flowing out/escaping when the coating device stands still.

Moreover, coating device arrangements of this type may, for example, be provided with a stroking/sweeping member, by means of which particulate material applied to the construction field may be stroked to compress and/or level the construction material.

An example of a coating device arrangement having a "slot coating device" is known from DE 10 2009 056 689 A1. See therein, for example, FIGS. 17 to 20.

It may be considered as a problem underlying the invention to provide a coating device arrangement for a 3D printer including a "container coating device", which has an extended scope of application.

The present invention provides a coating device arrangement for a 3D printer according to claim 1. Further embodiments of the coating device arrangement are described in dependent claims 2 to 21. Claim 22 describes a 3D printer including a corresponding coating device arrangement, and claim 23 describes a method for applying two layers of particulate construction material.

According to various embodiments, a coating device arrangement may be provided by way of illustration, in which the degree of compression of the applied layer of the particulate construction material can be adjusted appropriately by means of an appropriate setting of the inclination angle of the stroking member of a coating device, whereby eventually one or more features of the component, such as of a foundry core and/or a casting mold may be set specifically.

According to various embodiments, a coating device arrangement may be provided by way of illustration, in which various construction material compositions can reliably be applied in/onto a construction field in even layers and/or can be compressed appropriately by adjusting the inclination angle of the stroking/sweeping member of a coating device, so that in the end a plurality of different construction material compositions can be processed using the coating device arrangement.

According to various embodiments, a coating device arrangement may be provided by way of illustration, in which the degree of compression within a component to be manufactured and/or the layer compound to be established can be varied specifically by means of variation of the inclination angle of the stroking/sweeping member of a coating device during a construction job, to manufacture a component having different compression degree zones and/or several components having a different compression degree in one construction job.

According to various embodiments, a coating device arrangement may be provided by way of illustration, in which a plurality of construction material layers of constant quality and/or compression can be applied by adjusting or readjusting the inclination angle of the stroking member of a coating device during a construction job, so that a constant quality and/or compression is/are possible over a long construction job and/or a plurality of construction jobs, for example in a simple and safe manner.

According to various embodiments, a coating device arrangement may be provided by way of illustration, in which even and appropriately compressed construction material layers can be applied within a short period of time. According to various embodiments and by way of illustration, a respectively appropriate inclination angle can be set on a journey and on a return journey of the coating device, so that a bidirectional coating is made possible without affecting the applied layer's quality.

In this respect, particulate construction material within the meaning of this application may be understood as a construction material comprising at least one kind of particulate material (for example (grains of) sand, for example foundry sand, and/or metal particles and/or particles of synthetic material). Several different types of particulate material may be included in the construction material as well, such as a mixture of new sand and recycled sand or a mixture of fine sand and coarse sand or a mixture of two different types of sand. Moreover, the construction material may comprise at least one liquid component, for example a binder component, for example an activator, and/or one or more solid and/or liquid additives. In case that the construction material contains a binder component, another binder component, such as furan resin, may selectively be printed onto a previously applied construction material layer by means of a printing device, so as to solidify this layer in a predetermined area. Depending on the component to be manufactured, for example a casting mold or a foundry core and/or the purpose of use of the respective component, a construction material composition specifically prepared for this purpose may be used. In this respect, the construction material composition may be defined by the number of components used as well as by the respective type and the respective share of components contained in the construction material (mixture), for example including a respective particle size (in case of a solid).

According to different embodiments, a coating device arrangement for a 3D printer may comprise:

a coating device (for example "container coating device", for example "slot coating device" which is horizontally displaceable across a construction field and configured to continuously output particulate construction material from the opening onto the construction field during this horizontal movement across the construction field) including a container which defines an inner cavity for receiving particulate construction material which leads to an opening for outputting the particulate construction material (for example on/in a construction field or on/in a construction space), and a stroking/sweeping member by which a downward oriented stroking surface (for example oriented towards the construction field or the construction space) is formed, and which is configured to stroke over construction material output from the opening using the stroking surface to thereby level and/or compress the output particulate material, and a setting device which is configured to variably set an inclination angle of the stroking surface, for example to variably set the inclination angle in a fixed manner and/or to variable set and hold/fix it (in the respective setting) (for example for at least a substantial or predominant part of a journey across a construction field or during an entire journey across a construction field).

The coating device may, for example, be displaceable in a horizontal direction, for example across a construction field. For example, the coating device may be displaceable along a linear guiding structure for this purpose, for example by means of a slide to which the coating device is attached.

The container may for example be formed in an elongate way, the longitudinal axis extending for example in the horizontal direction perpendicular to the direction in which the coating device is displaceable. In this respect, the opening may for example be formed as a longitudinal slot, the longitudinal axis of which extends in the horizontal direction, which is perpendicular to the direction in which the coating device is displaceable, and/or parallel to the longitudinal direction of the container.

The container may, for example, taper downwards in cross section and may, for example, be funnel-shaped in cross section.

The container may, for example, be open in an upward direction. A second container may, for example, be disposed above the container.

The opening or the longitudinal slot may, for example, be located at a lower end portion of the container, i.e., for example, at an end portion of the coating device facing the construction field, and may, for example, be directed downward toward the construction field.

The construction field may, for example, be defined by a construction platform and/or construction box (also referred to as "job box"), above/on or in which a component is/can be constructed by means of a 3D printer in a generative manufacturing process. The construction box may, for example, receive a height-adjustable construction platform which is gradually lowered during the generative manufacturing process (or during a so-called "construction job"). The drive for the height adjustment may, for example, be provided either directly in the construction box ("travelling along") or, for example, in a stationary way ("installation-fixed") in the 3D printer. The construction box may, for example, be displaceable out of or into the 3D printer, for example through a roller conveyor and/or through its own travel drive integrated in the construction box. The construction box may, for example, be provided as described initially, for example as described in DE 10 2009 056 969 A1.

The information provided hereinafter applies both to one stroking member and to two or more stroking members, i.e. to a respective stroking member.

The stroking member may, for example, be co-formed by the container, for example by a lower side thereof, or may, for example, be formed as a separate member and may be attached to the coating device, for example to a carrier structure thereof or to the container. If the stroking member is attached to the coating device as a separate member, the stroking member may, for example, be attached to the coating device in a fixed or movable (for example pivoting) way. In the first case the stroking member can be moved by means of a movement, for example by means of a pivoting movement of the coating device, in order to set the inclination angle of its stroking surface. In the second case the stroking member can be moved directly and thus by itself, in order to set the inclination angle of its stroking surface.

To level and/or compress construction material, the stroking member is, for example, arranged in the travel direction behind the opening, for example with an inclination decreasing rearward or an inclination rising in a travel direction. The inclination angle may, for example, be an acute angle, for example an angle of less than or equal to 5°, for example an angle of less than or equal to 4°, for example an angle of less than or equal to 3°, for example an angle of less than or equal to 2°, for example an angle of less than or equal to 1°.

The coating device may, for example, comprise only one stroking member, the coating device arrangement being operated in a unidirectional way. The coating device may, for example, comprise two stroking members, the coating device arrangement being operated in a bidirectional way. In the latter case, the stroking members may, for example, be disposed on opposite sides of the opening (for example in a cross direction), and the inclination angle of a respective stroking member may be variably adjustable, for example by means of the setting device. In the latter case, the stroking members may be arranged with their stroking surfaces being coplanar.

The stroking surface of the stroking member may, for example, be configured in a substantially planar way. For example, the stroking member may be elongate in shape, which may, for example, extend substantially parallel to the longitudinal direction of the container, for example substantially along the entire slot thereof. For example, the stroking member may be formed as a stroking bar/strip and/or as a stroking blade. The stroking member may, for example, be made of metal, for example of steel.

The stroking member may, for example, be disposed underneath the opening, for example in a vertical direction below the opening, for example at a (small) vertical distance to the opening. In other words, the stroking member may be disposed outside or underneath the container interior space, for example outside or underneath the container. The stroking member may, for example, be arranged laterally next to the opening in a horizontal direction.

The setting device may, for example, be displaceable across the construction field together with the coating device.

The setting device may, for example, be configured to variably set the inclination angle of the stroking surface with respect to a stationary reference plane, for example with respect to a horizontal surface and/or a surface parallel to the construction platform and/or a surface parallel to the construction field and/or a surface parallel to the last applied layer. The inclination angle may, for example, be an acute angle.

According to different embodiments, the setting device may, for example, comprise a drive by means of which the inclination angle of the stroking surface is modifiable. The term drive refers to a non-manual drive, for example. The drive may, for example, be configured to move the stroking member directly or indirectly, for example to pivot the stroking member.

According to various embodiments, the drive may, for example, be a linear drive or a rotary or pivot drive. In other words, the drive emits, for example, a translatory motion or generates such translatory motion (which in turn may be used/converted to pivot the closing element and/or the coating device), or emits a torque by at least one full revolution or by less than a full revolution.

According to various embodiments, the drive may, for example, be chosen from the group consisting of a hydraulic drive, a pneumatic drive, an electric drive and combinations thereof.

According to various embodiments, the drive may, for example, be configured to variably set the inclination angle of the stroking surface directly by means of the drive itself. In this context, the drive may, for example, be provided as an electric drive. The drive may, for example, thus be configured to hold the stroking member and/or the coating device in a respective position, for example a pivot position.

According to various embodiments, the setting device may, for example, further comprise a limit stop configured to limit a movement (for example of the stroking member and/or the coating device) generated by the drive to a particular degree to thereby set the inclination angle of the stroking surface. For example, a pivot range of the stroking member and/or of the coating device may be set using the limit stop, for example a vertical pivot range.

According to various embodiments, the limit stop may, for example, be variably adjustable, so that the inclination angle of the stroking surface can be set by adjusting the limit stop. In this respect, the limit stop may, for example, be manually or electrically adjustable.

According to various embodiments, the setting device may, for example, be formed as a pivot device configured to pivot the stroking member (directly or indirectly) to thereby set the inclination angle of the stroking surface. The stroking member may, for example, be pivoted about a fixed pivot axis and/or an external pivot axis or the body's own pivot axis and/or a horizontal pivot axis which is, for example, parallel to the coating device longitudinal axis and/or perpendicular to the traveling direction of the coating device and/or in a vertical pivot range and/or by means of the above-described drive.

According to various embodiments, the pivot device may, for example, be configured to pivot the coating device to thereby pivot the stroking member and to hereby set the inclination angle of the stroking surface. Thus, the entire coating device may, for example, be pivoted about the body's own pivot axis to set the inclination angle of the stroking surface, or the coating device may be formed as a pivoting coating device. The coating device may, for example, be pivoted about a fixed pivot axis and/or the body's own pivot axis and/or a horizontal pivot axis which is, for example, parallel to the coating device longitudinal axis and/or perpendicular to the traveling direction of the coating device, and/or in a vertical pivot range and/or by means of the above-described drive.

According to various embodiments, the coating device arrangement may, for example, further comprise a bearing block by which the coating device is pivotably supported, for example on one of its front sides, for example by means of a trunnion/pivot pin. The bearing block may, for example, be displaceable together with the coating device. The coating device may be pivotably supported on its other front side, for example by means of another bearing block. The above-described drive may, for example, be mounted to the bearing block, for example between bearing block and coating device.

According to various embodiments, the coating device arrangement may, for example, further comprise a linear guiding structure along which the bearing support is displaceable, for example in a horizontal direction, for example across a construction field or a construction space.

According to various embodiments, the coating device arrangement may, for example, further comprise a control unit (for example a "controller" and/or an electronic control unit) which is connected to the setting device, for example to the drive and/or the limit stop, and which is configured to control the setting device in such a way that it sets/adjusts the inclination angle, for example sets and/or readjusts the inclination angle to an initial value, for example prior to a construction job and/or during a construction job, for example for an appropriate compression/leveling. I.e., the control unit sets the inclination angle by means of the setting device. In other words, the inclination angle is set in a controlled way (using the setting device), for example in a way controlled by the drive.

According to various embodiments, the control unit may, for example, be configured to set the inclination angle to an initial value in accordance with a used/employed particulate material composition and/or one or more ambient conditions (for example air humidity and/or ambient temperature and/or ambient pressure) and/or a desired compression degree (for example of the layer to be applied and/or the component to be manufactured), for example based on a respectively associated parameter or set of parameters (for example comprising a drive parameter and/or pivot angle) stored in the control unit. The particulate material composition used/employed and/or the one or more ambient conditions and/or the desired degree of compression may, for example, be provided to the control unit by means of an operator station of a 3D printer, for example by means of an operator panel. The particulate material composition used/employed and/or the one or more ambient conditions may, for example, be detected automatically by corresponding sensors and may be forwarded to the control unit.

According to various embodiments, the coating device arrangement may, for example, further comprise an inclination sensor configured to measure a value representative of the current inclination angle of the stroking surface. The inclination sensor may, for example, comprise one or more acceleration sensors. It shall be understood that any other appropriate inclination sensor may be used as well. The inclination sensor may, for example, be attached to the coating device, for example to the carrier structure thereof or to the stroking member itself.

The inclination sensor may, for example, be connected to the control unit to transfer the measured value to the control unit.

The control unit may, for example, be configured to set the inclination angle based on the value measured by the inclination sensor, for example to set and/or readjust the inclination angle to an initial value (for example by means of control or regulation/feedback control). The control unit may, for example, be configured to set the inclination angle to an initial value based on the value detected by the inclination sensor and according to a used/employed particulate material composition and/or one or more ambient conditions and/or a desired degree of compression. In this respect, the inclination sensor may, for example, be used for monitoring and/or orientation and/or zero-point determination. Using the inclination sensor it is, for example, possible to prevent a set/actual inclination angle from deviating from a desired inclination angle due to, for example, wear and tear and/or variations in temperature.

According to various embodiments, the coating device arrangement may, for example, further comprise a density sensor configured to measure a value representative of the density (for example the degree of compression of the layer) of an applied layer. The density sensor may, for example, comprise one or more optical sensors directed to the construction field, which optically scan an applied construction material layer and therefrom draw conclusions with respect to the degree of compression, for example by determining the layer's porosity. It shall be understood that another appropriate density sensor may be used as well.

The density sensor may, for example, be attached to the carrier structure. The density sensor may, for example, be connected to any one of the above-described control units to transfer the detected value to the control unit.

The control unit may, for example, be configured to set the inclination angle based on the value detected by the density sensor, for example to readjust the inclination angle (for example in case of a predetermined deviation from an expected density value (for example a set value) or density value range), for example during a construction job (=manufacture of one or more parts in an associated construction space), for example to regulate the density to a set value and/or change an inclination angle set value depending on the detected density value and/or to reduce a disturbance variable. A disturbance variable may, for example, be a change in the construction material composition (for example a change in the grain size thereof) and/or a change in one or more ambient conditions. Air humidity and/or temperature may, for example, substantially change during a construction job or over several construction jobs, and/or a construction material composition which is, for example, provided by a coating device feeding unit having a mixing container (for example comprising a stirring unit) may substantially change which may respectively affect the compression achieved with a particular inclination angle. Such a change or compression deviation may be detected by the density sensor, and the control unit may respond thereto correspondingly, for example by a density regulation or a density control. Alternatively or in addition, the control unit may output an alarm and/or interrupt the construction job and/or stop the construction job, if a predetermined deviation from an expected density value or density value range is detected by means of the density sensor.

The following may for example apply to the coating device arrangement according to various embodiments:

the coating device may be formed as a bidirectional coating device configured to output construction material on a journey and on a return journey (for example on each of two directly successive travels) of the coating device, the coating device may comprise a stroking member on each of two opposing sides of the opening, so that particulate construction material output from the opening during the journey can be stroked using a first one of the stroking members and particulate construction material output from the opening during the return journey may be stroked using a second one of the stroking members, and the setting device may be configured to set, for the journey, the inclination angle (for example also the position) of the stroking surface of the first stroking member for a leveling and/or compression of the output particulate construction material, and to set, for the return journey, the inclination angle (for example also the position) of the stroking surface of the second stroking member for a leveling and/or compression of the output particulate construction material.

The setting device may thus, for example, be configured to respectively set the inclination angle of the stroking member which in a travel direction is located to the rear for a leveling and/or compression of the output particulate construction material during two directly successive travels.

For example, the coating device arrangement may comprise a control unit (for example a control unit formed as described above) configured to control the setting device in such a way that, for the journey, it sets the inclination angle (for example also the position) of the stroking surface of the first stroking member for a leveling and/or compression of the output particulate construction material, and for the return journey sets the inclination angle (for example also the position) of the stroking surface of the second stroking member for a leveling and/or compression of the output particulate construction material.

According to various embodiments, the setting device may, for example, be configured to adjust the inclination angle of the stroking surface of the first stroking member and the inclination angle of the stroking surface of the second stroking member together, i.e. if the angle of one stroking surface is adjusted, the angle of the other stroking surface is adjusted as well.

According to different embodiments, the setting device may, for example, be configured to pivot the coating device for the journey in a first direction, to thereby set the inclination angle of the stroking surface of the first stroking member for a leveling and/or compression of the output particulate construction material, and to pivot the coating device for the return journey in a second direction opposite to the first direction, to thereby set the inclination angle of the stroking surface of the second stroking member for a leveling and/or compression of the output particulate construction material.

For example, the coating device arrangement may comprise a control unit (for example a control unit formed as described above) configured to control the setting device in such a way that it pivots the coating device in a first direction for the journey, to thereby set the inclination angle of the stroking surface of the first stroking member for a leveling and/or compression of the output particulate construction material, and pivots the coating device in a second direction opposite to the first direction for the return journey, to thereby set the inclination angle of the stroking surface of the second stroking member for a leveling and/or compression of the output particulate construction material.

According to different embodiments, a 3D printer (or a "3D printing installation") may, for example, comprise a coating device arrangement which is formed as described above.

For example, several 3D printers may form a 3D printer arrangement.

For example, the (respective) 3D printer may further comprise:

a printing device for the selective and controlled output of a treatment agent, which is configured to print the treatment agent on a predetermined subarea of a previously applied construction material layer (the treatment agent output by means of the printing device contributes to a selective solidification and may, for example, be a binder component of a multicomponent binder, another binder component being included in or added to the construction material); and/or a feeding unit integrated in the 3D printer, by means of which construction material can be freshly prepared and fed to the coating device, and/or one or more construction platforms and/or construction boxes which define a respective construction field.

The printing device may, for example, be displaceable horizontally, for example in a direction perpendicular to the direction in which the at least one coating device is displaceable. The printing device may, for example, be configured to serve several construction fields. The printing device may, for example, be additionally displaceable in a direction in which the at least one coating device is displaceable as well, so that it can travel across the construction field or the construction fields in a meandering course, for example in the shape of a U.

Alternatively, a respective construction material layer may, for example, be selectively solidified, for example sintered, by means of a laser (so-called "selective laser sintering").

The feeding unit may, for example, comprise a mixing container having a stirring unit as well as one or more storage containers from which a respective particulate material can be fed to the mixing container. The mixing container having a stirring unit as well as the one or more storage containers may, for example, be arranged in a vertical direction above the at least one construction field. Moreover, the mixing container may, for example, be connected to a liquid container through a metering pump, from which a liquid component can be fed to the mixing container. The mixing container may, for example, have a dispensing shaft/duct through which the coating device can be filled with freshly prepared construction material when moved to a filling position.

According to different embodiments, a method for applying two (for example more) layers of particulate construction material may be provided, wherein:

a coating device including a container having an inner cavity which is filled with particulate construction material and leads to an opening for outputting the particulate construction material is moved in a first direction across a construction field to form a first layer of construction material during a first travel, the particulate construction material output from the opening during the first travel is stroked using a first stroking member by which a stroking surface is formed, facing the construction field, to level and/or to compress the output particulate material using the stroking surface, the coating device is moved in a second direction (which is, for example, opposed to the first direction) across the construction field to form a second layer of construction material during a second travel, the particulate construction material output from the opening during the second travel is stroked using a second stroking member by which a stroking surface is formed, facing the construction field, to level and/or compress the output particulate material using the stroking surface, the coating device is pivoted in a first direction for the first travel (for example in a controlled way) to thereby set, for example to set in a fixed way and/or to set and hold, the inclination angle of the stroking surface of the first stroking member for a leveling and/or compression of the output particulate construction material, and the coating device is pivoted in a second direction for the second travel (for example in a controlled way) to thereby set, for example to set in a fixed way and/or to set and hold, the inclination angle of the stroking surface of the second stroking member for a leveling and/or compression of the output particulate construction material.

The described method may, for example, be part of a generative manufacturing process.

In the case of two or more stroking members and a pivoting of the coating device, the coating device can be deflected or pivoted in both directions by the same amount and/or the vertical pivoting range may be bisected by a vertical line in the above-described embodiments.

Exemplary but non-limiting embodiments of the invention are shown in the Figures and are hereinafter described in detail.

FIG. 1 shows a lateral view of a coating device arrangement according to an embodiment.

FIG. 1a shows an enlarged portion of the lateral view of FIG. 1,

Figure 2:
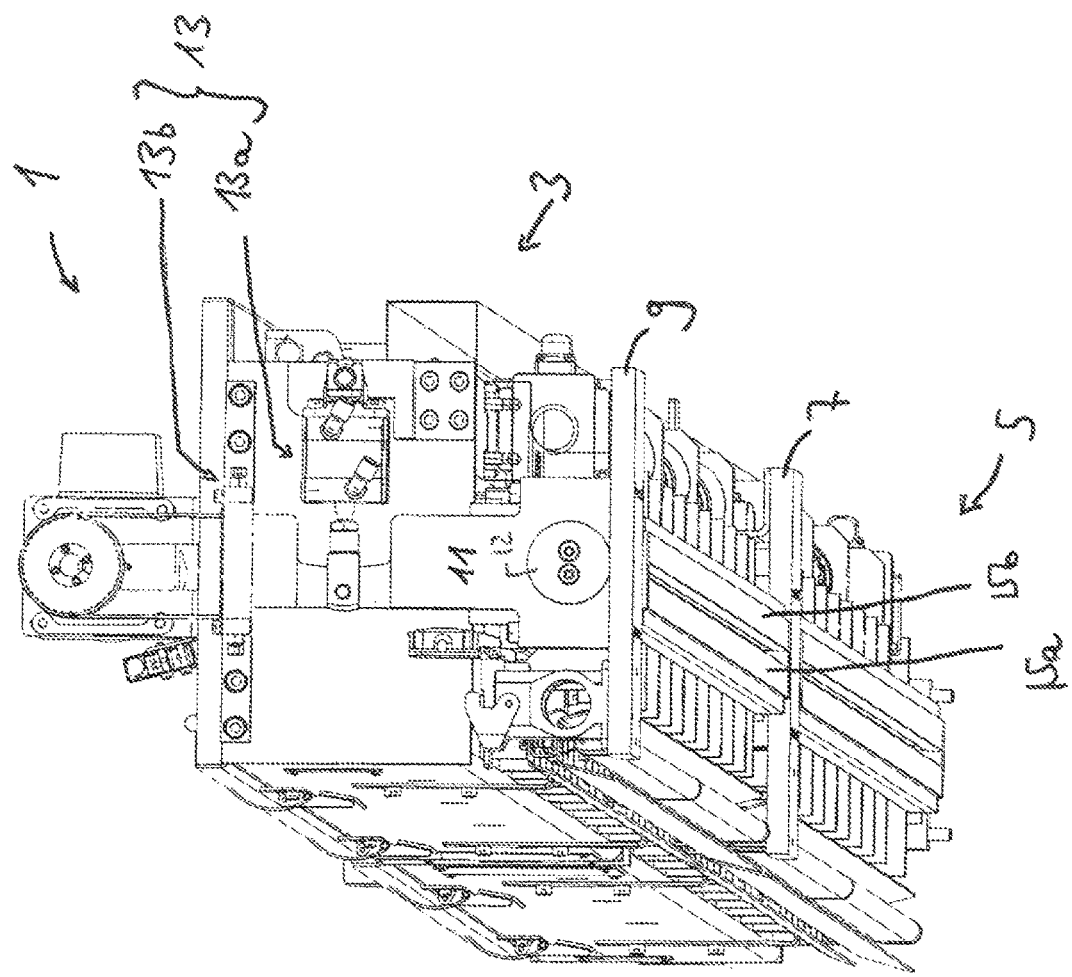
Figure 3:
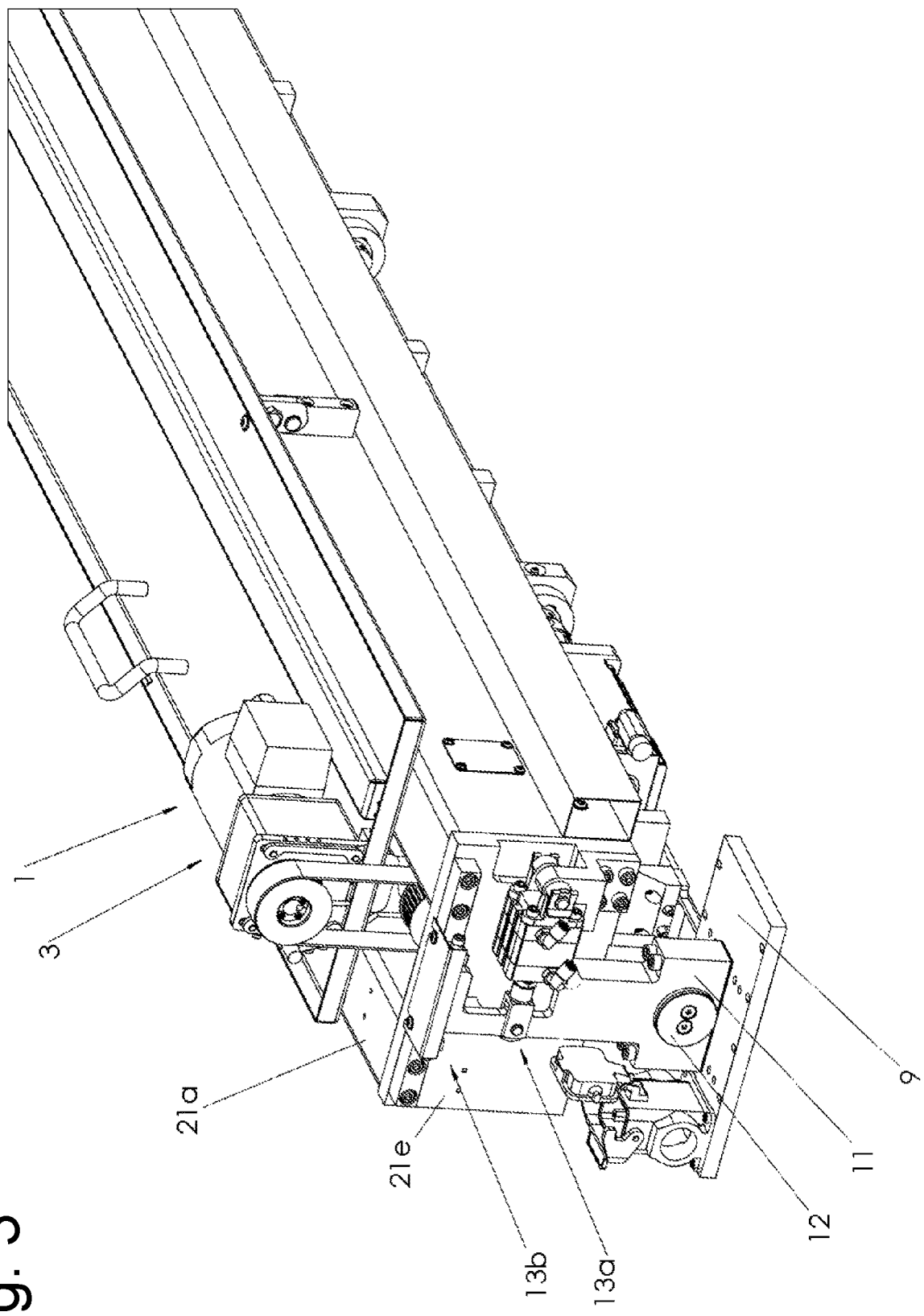
Figure 4:
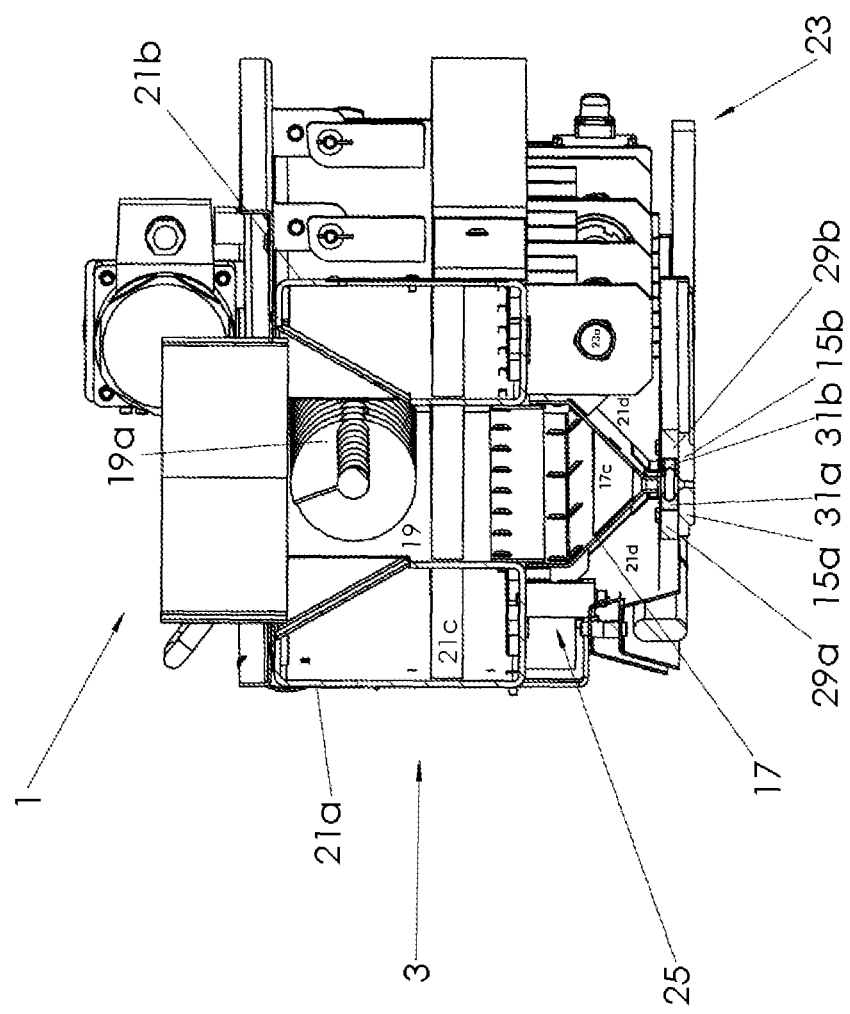
Figure 5:
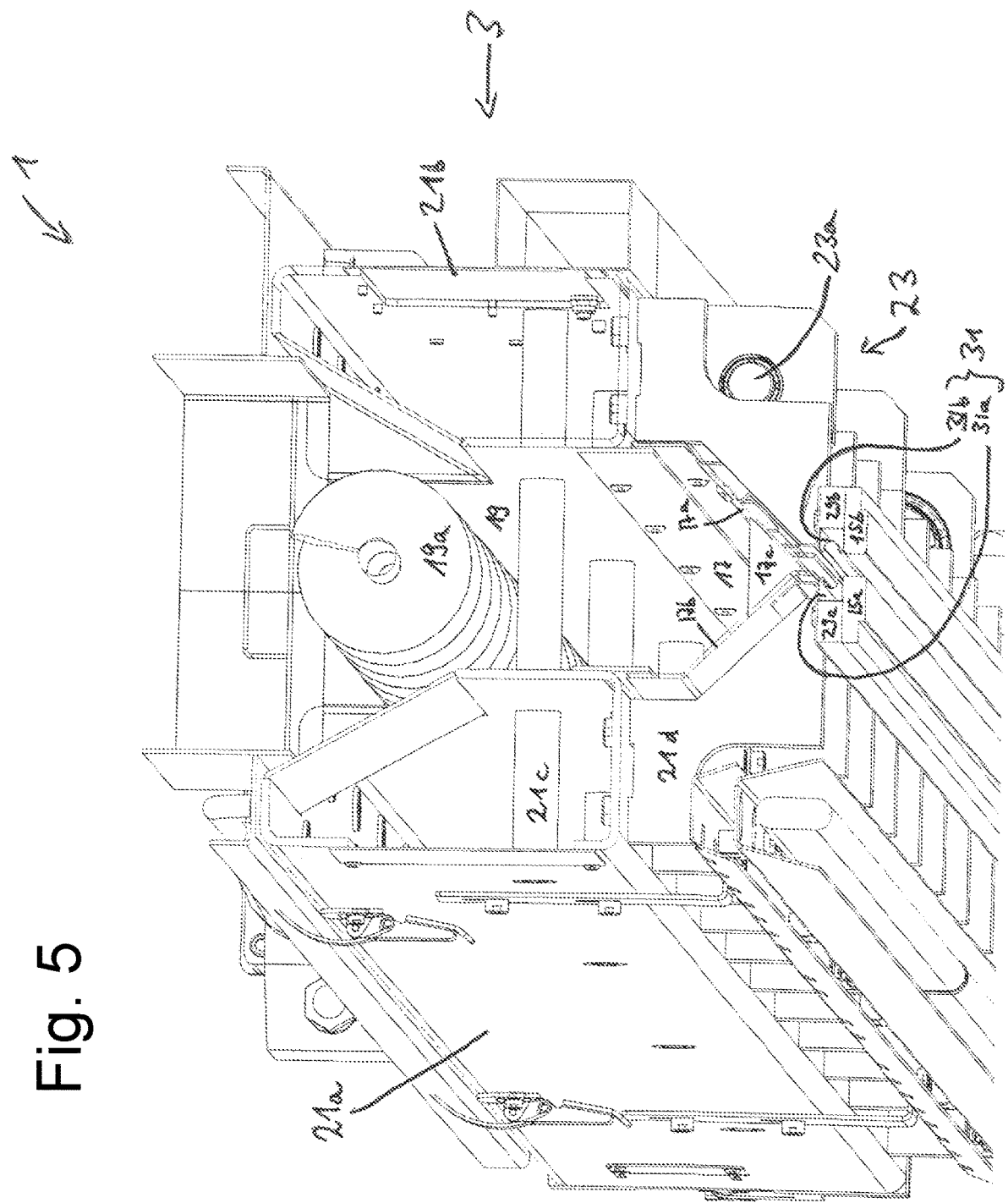
Figure 6:
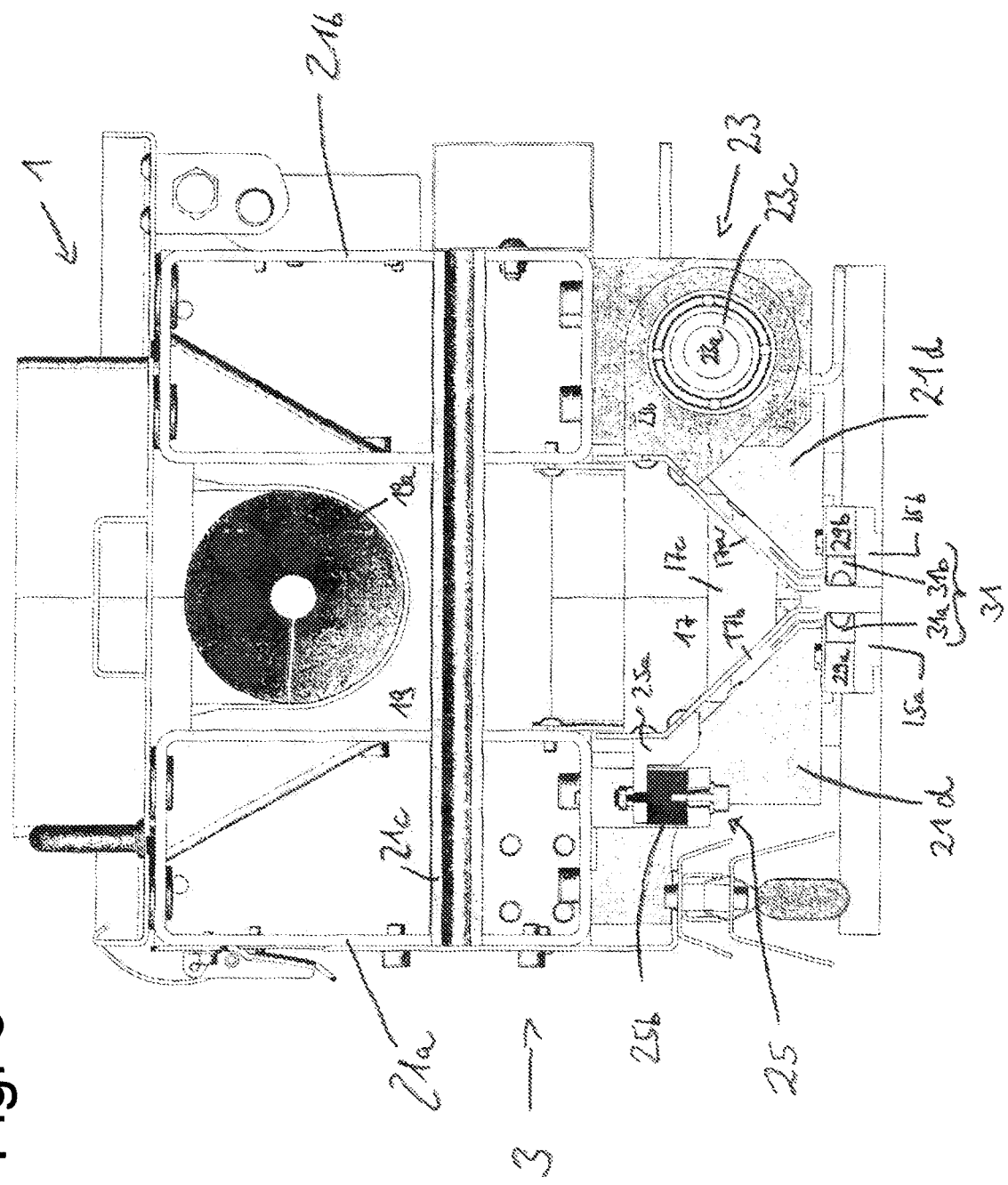
Figure 7:
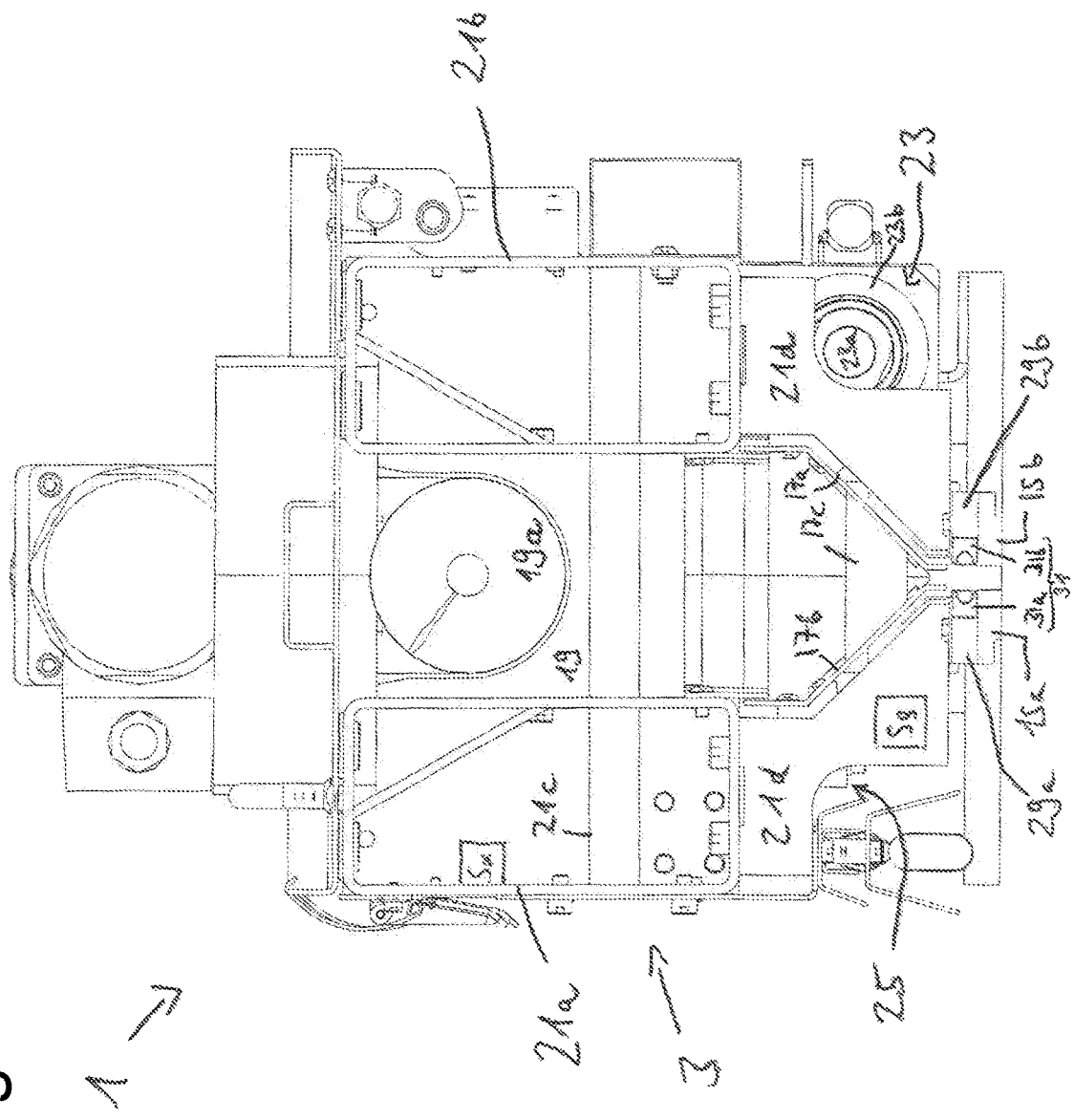
Figure 8A:
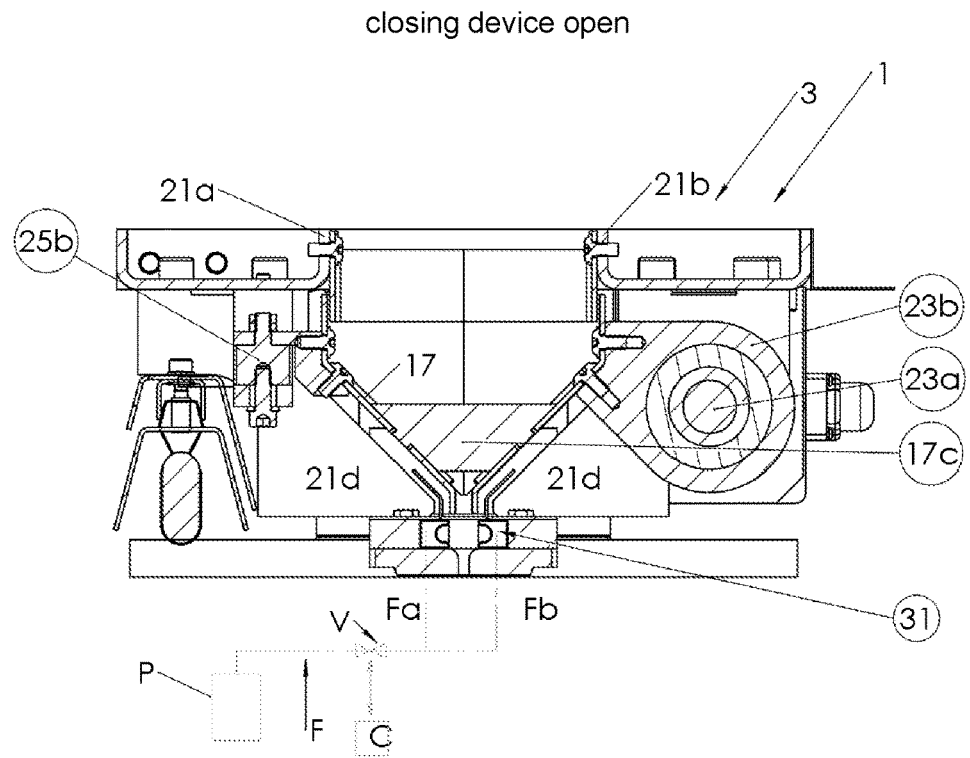
Figure 8B:
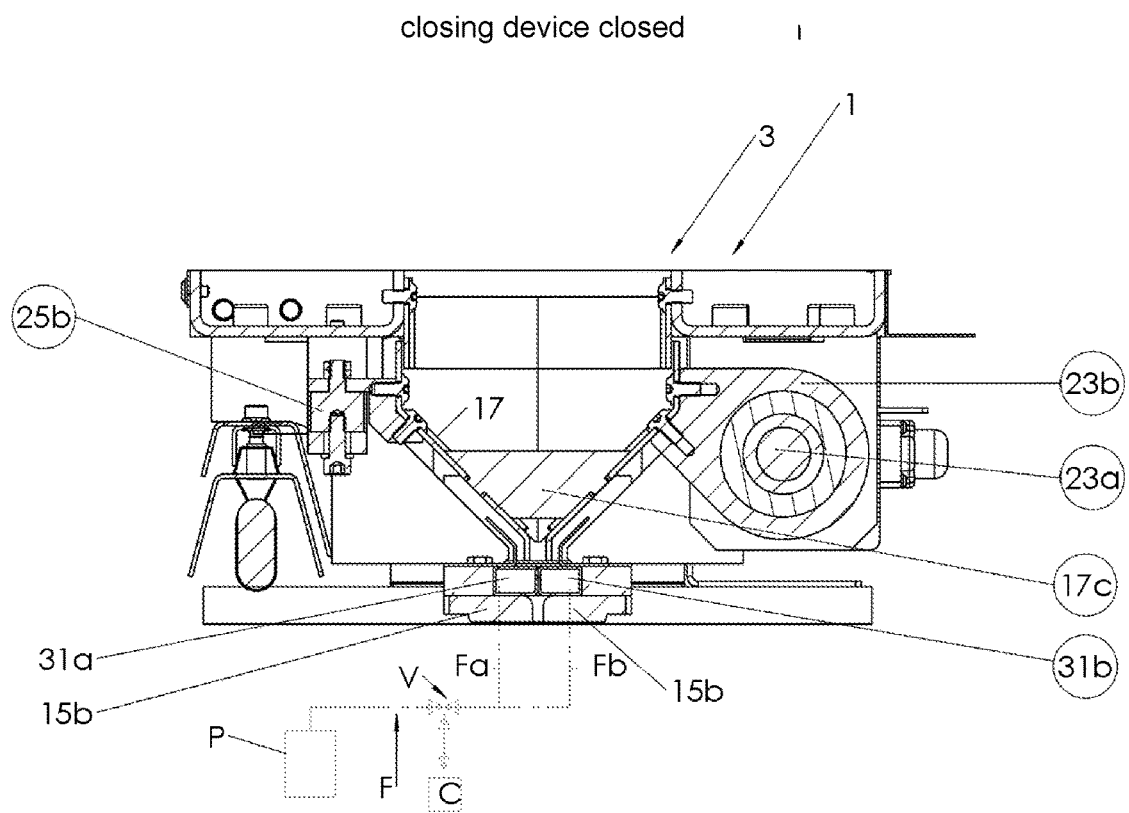
Figure 9:
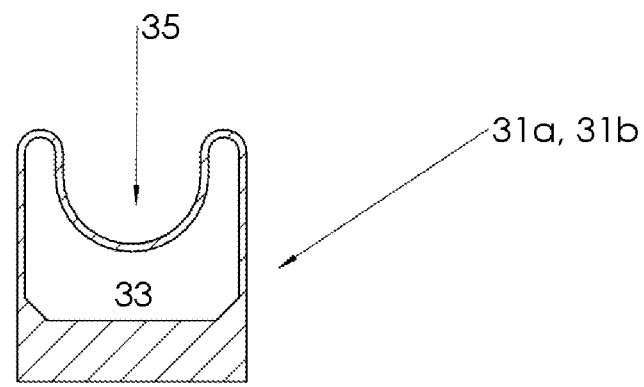
Figure 10:
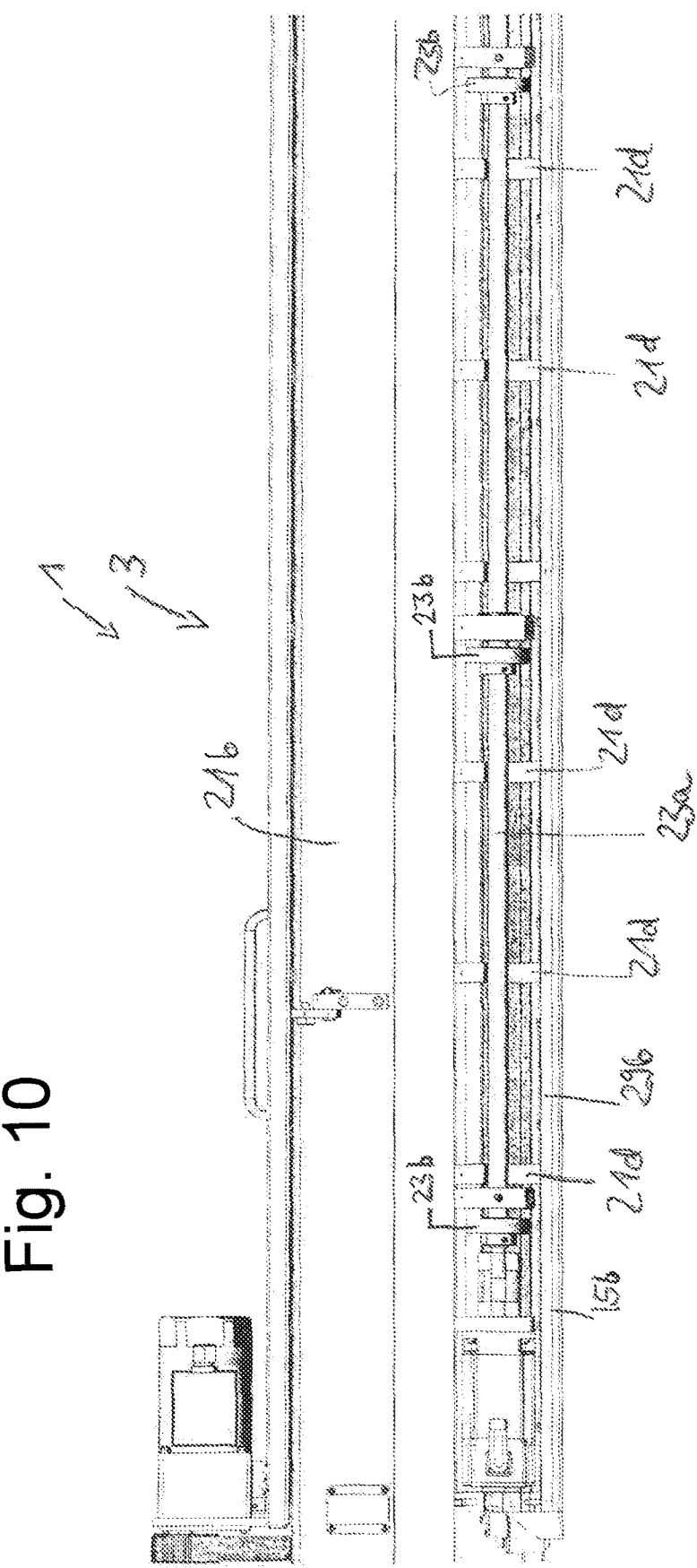
Figure 14:
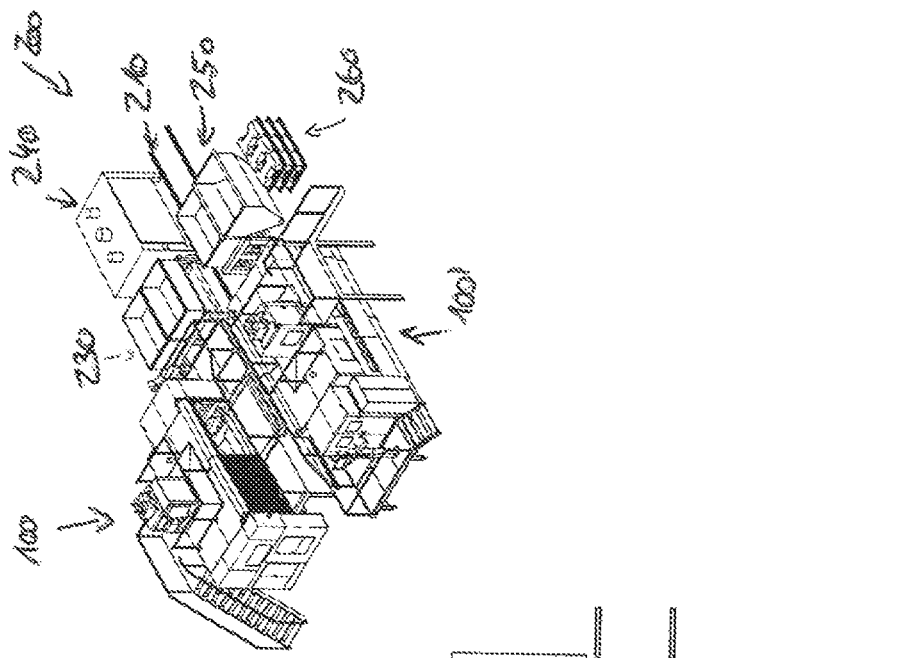
Figure 13:
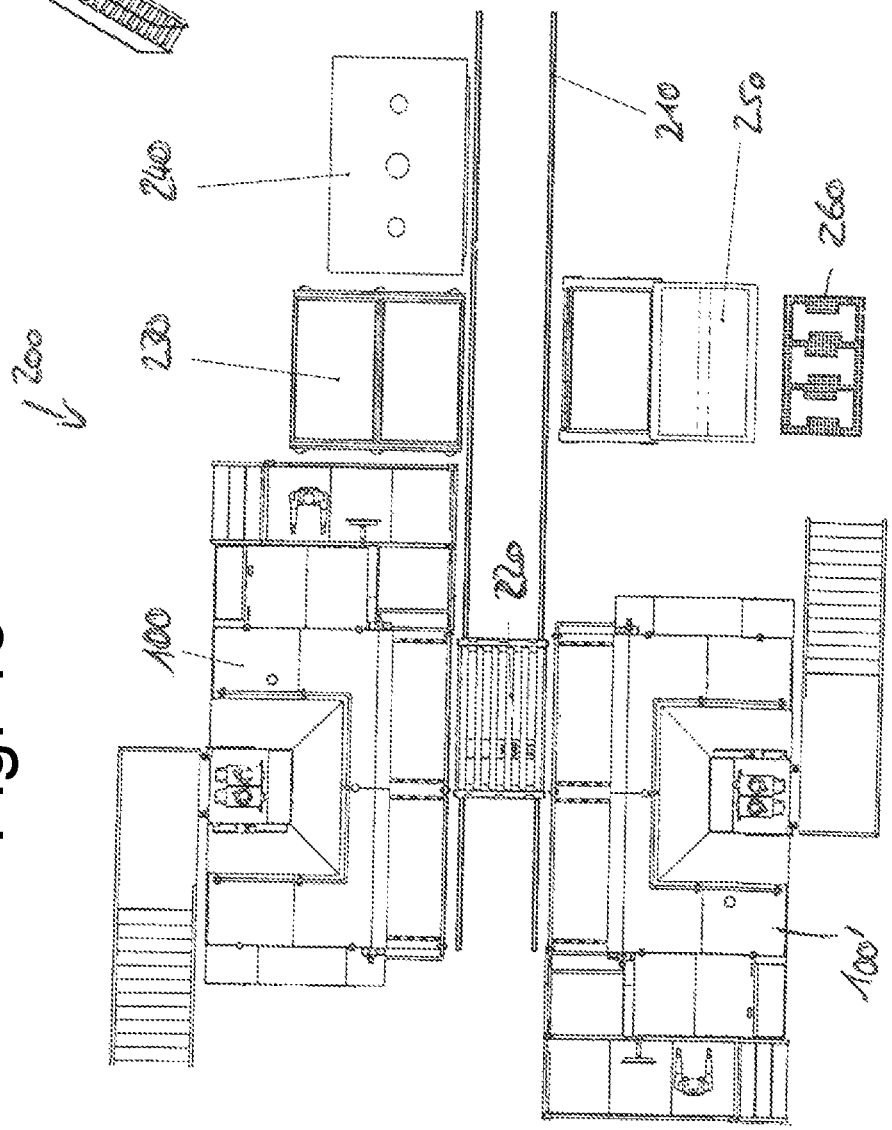

FIG. 2 shows a perspective view of a front side of the coating device arrangement according to FIG. 1, FIG. 3 shows another perspective view of the front side according to FIG. 2, FIG. 4 shows a sectional perspective view of the coating device arrangement according to FIG. 1, FIG. 5 shows a sectional perspective view of the coating device arrangement according to FIG. 1, FIG. 6 shows a cross-sectional view through the coating device arrangement of FIG. 1 at a first longitudinal position, FIG. 7 shows a cross-sectional view through the coating device arrangement according to FIG. 1 at a second longitudinal position, FIG. 8a shows another cross-sectional view through the coating device arrangement, the closing device being open, FIG. 8b shows another cross-sectional view through the coating device arrangement, the closing device being closed, FIG. 9 shows a cross-sectional view through a closing member for use in a coating device arrangement according to the invention in an open state of the closing member, FIG. 10 shows another enlarged portion of the lateral view according to FIG. 1, FIG. 11 shows a 3D printer according to an embodiment, the installation housing and the feeding unit having been omitted, FIG. 12 shows the 3D printer according to FIG. 11, this time with a major part of the installation housing and with the integrated feeding unit, FIGS. 13 and 14 show a top view and a perspective view from above, respectively, of a 3D printer arrangement including a first and a second 3D printer, FIGS. 15a to 15c show different views of a coating device arrangement according to a further embodiment, and FIGS. 16a to 16d show coating device arrangements according to various embodiments.

In the following detailed description, reference is made to the enclosed Figures which are incorporated therein and in which specific embodiments are shown by way of illustration, according to which the invention can be performed. In this respect, the terms "up", "down", "front", "rear", etc. are used with reference to the orientation in the described Figures. As components of embodiments may be positioned in a number of different orientations, the terminology indicating the different directions serves for illustration and shall not be restrictive in any way.

It shall be understood that other embodiments may be used and structural or logical changes may be made without deviating from the scope of protection of this invention. It goes without saying that the features of the various exemplary embodiments described herein may be combined unless specified otherwise. Thus, the following detailed description should not be understood in a restrictive sense and the scope of protection of the invention shall be defined by the attached claims.

In this description, terms such as "connected", "attached" or "coupled" may be used to describe both a direct and indirect connection, a direct or indirect attachment and a direct or indirect coupling.

In the Figures, identical or similar members are provided with identical reference numbers where appropriate.

FIG. 1 shows a side view of a coating device arrangement 1 according to a first embodiment of the invention.

By way of example, the coating device arrangement is here provided with two coating devices 3, 5. It shall be understood that the coating device arrangement 1 may alternatively be equipped with only one coating device 3 or with more coating devices, the features described below being applicable analogously, i.e. not being limited to a coating device arrangement having two coating devices.

The coating device arrangement 1 shown herein comprises a first coating device 3 and a second coating device 5. Hereinafter, mainly the first coating device 3 will be described and the features mentioned in this connection can be applied analogously to the second coating device 5.

The first coating device 3 and the second coating device 5 may, for example, be firmly connected through a base plate 7, so that they are displaceable together across a respective construction field. In the present case, each coating device is fixed to, for example supported by the base plate 7 at one of its front sides. On the other hand, the base plate 7 can be displaceable along a linear guiding structure (not shown) which would extend perpendicular to the plane of projection in FIG. 1.

In addition, the first coating device 3 may, for example, be attached to another base plate 9 with its other front side. On the other hand, the base plate 9 may be displaceable along another linear guiding structure (not shown either). The second coating device 5 may also be fixed to another base plate (not shown) on its other front side.

As shown in FIG. 1, both coating devices 3 and 5 may, for example, be formed to be elongate, the respective longitudinal axis extending perpendicular to the direction of movement. Moreover, both coating devices 3 and 5 may be arranged one after the other in a longitudinal direction.

FIG. 2 and FIG. 3 each show a perspective view of a front side of the coating device arrangement according to FIG. 1.

As shown by FIGS. 2 and 3, the first coating device 3 may, for example, be attached to the base plate 9 through a bearing block 11 on its free front side facing away from the second coating device 5. Analogously, the coating device 3 may, for example, be fixed to the base plate 7 through another bearing block.

The coating device 3 may, for example, be pivotally mounted to the respective bearing block 11, for example by means of a pivot pin 12. This enables a pivoting of the coating device 3 about a horizontal pivot axis which extends parallel to the longitudinal axis of the coating device 3 to set an angle of inclination of one or more stroking members 15a and 15b attached to the coating device by means of a pivot device 13.

By way of example, the pivot device 13 is here provided with a hydraulic drive 13a arranged between the bearing block 11 and the coating device 3, and an electronically adjustable limit stop system 13b which variably limits the pivoting angle of the coating device to the right and to the left. Cf. also FIG. 1b. In this respect, the coating device 3 may, for example, be pivoted in a first direction for a first travel ("journey") and in a second direction for a second travel ("return journey").

The stroking members 15a and 15b are, by way of example, provided as stroking strips/bars and may, for example, be made of steel. The stroking members 15a and 15b may also be referred to as blades.

As shown in FIG. 2, the stroking members 15a and 15b form, for example, a downward oriented stroking surface which is substantially formed to be planar. A desired degree of compression of the particulate material can be set by setting the inclination angle of the respective stroking surface of the stroking members 15a and 15b. In this respect, the present coating device 3 is formed as a bidirectional coating device by way of example, which may coat in both directions during a journey and during a return journey and which may compress the output particulate material appropriately.

It shall be understood that the described coating device arrangement may also be formed as a unidirectional coating device arrangement, in which case one of the blades may be omitted.

As shown by FIGS. 4 to 7, the coating device 3 may, for example, comprise a first lower container 17, a second upper container 19 (optionally) and a carrier structure.

The carrier structure may, for example, comprise one or more carriers 21a, 21b extending crosswise to the direction of movement or rather in a coating device longitudinal direction, which may be connected by several pipes or bars 21c along the coating device longitudinal direction in a transverse direction. As shown by FIG. 3, the carriers 21a, 21b may, for example, be connected to a connecting plate 21e by at least one of their front sides.

The first and second containers 17, 19 may, for example each have an elongate shape.

By way of example, the first container 17 has a shape tapering downward in cross-section, for example a funnel shape. The first container 17 has a longitudinal slot (no reference number) at its lower end. The first container 17 may, for example, be open at its upper end, and may be connected to a lower, open end of the optional second container 19. For example, the first container 17 may be reinforced along the longitudinal direction by one or more reinforcing members 17c.

By way of example, the first container 17 is embodied as a vibration/shaking container, one side wall 17a (here the right side wall) of which may be exposed to a vibration/shaking movement using a vibration/shaking device to vibrate particulate construction material received in the container 17.

By way of example, the first container 17 is here connected to the carrier structure 21b by the vibration device 23 on one side (here on the right side wall 17a), and is connected to the carrier structure 21a by a damping device 25 on the other side (here on the left side wall 17b). See for example FIG. 6.

As shown, the vibration device 23 may, for example comprise a shaft 23a which is connected to an eccentric rod 23b by an eccentric 23c, which is connected to one side of the first container 17. Several eccentric rods 23b and/or eccentrics 23c may, for example, be provided one after another in a coating device longitudinal direction. See, for example, FIG. 10.

The damping device 25 may, for example, comprise a damping member 25b attached to the carrier structure 21a, as well as a projecting portion 25a which is connected to or formed by the other side of the first container 17 and is supported by the damping member 25b. For example, several damping devices 25 may be provided one after another in a coating device longitudinal direction, i.e. the first container may be connected to the carrier structure at several positions in the coating device longitudinal direction.

The (optional) second container 19 may, by way of example, have a rectangular shape in cross section. Here, the second container serves as a so-called charging container which provides the first container with construction material. A distributing member 19a, here a distributing worm may, for example, be received in the second container. The second container 19 may be rigidly connected to the carrier structure and/or may be formed/limited by the same.

In the exemplary embodiment shown, the first container 17 and the second container 19 are vibration-decoupled from each other.

As can further be seen from FIGS. 4 to 7 (also see FIG. 10), the carrier structure may, for example, comprise one or more ribs 21d for example along the coating device longitudinal direction on both sides of the container 17, which are connected to the carriers 21a and 21b, respectively, in a substantially rigid way, and to which the stroking members 15a and 15b are attached to be vibration-decoupled from the first container 17, for example in a substantially rigid manner, for example using a respective bar/ledge 29a and 29b, respectively, which is, for example, fixed to the rib by a respective intermediate part (without reference number).

Above the first stroking member 15 and below the longitudinal slot, i.e. between the first stroking member 15a and the first container 17, an optional first closing member 31a may, for example, be arranged. By way of example, this optional first closing member 31a is surrounded by an upper side of the first stroking member in a downward direction and is, in addition, surrounded on a lateral side by the ledge 29a and, in an upward direction, by the intermediate part (without reference number). In a direction perpendicular to the longitudinal direction of the coating device 3 and perpendicular to an imaginary, vertical plane through the longitudinal slot, the first closing member 31a is free.

Analogously, an optional second closing member 31b may be arranged above the second stroking member 15b and below the longitudinal slot, i.e. between the second stroking member 15b and the first container 17. This second closing member 31b is, by way of example, surrounded by an upper side of the second stroking member 15b in a downward direction and is, on a lateral side, surrounded by the ledge 29b and, in an upward direction, by the intermediate part (without reference number). The second closing member 31b is free in a direction perpendicular to the longitudinal direction of the coating device 3 and perpendicular to the imaginary vertical plane through the longitudinal slot.

The respective closing member 31a, 31b may, for example, be connected to the associated stroking member and/or the associated ledge and/or the associated intermediate part in a fixed way, for example by adhesion.

Both closing members 31a and 31b which are, for example, formed to be elongate, together form an optional closing device 31 which is configured to selectively close the opening of the container 17 for outputting the particulate construction material. In FIG. 4 to FIG. 7, the closing members 31a and 31b are shown in their respective open state.

The closing members 31a and 31b may selectively cover the opening in its respective closing state in parts (for example following a lateral expansion of the respective closing member), so that the closing members 31a and 31b close the opening together.

As illustrated by FIGS. 8a, 8b and 9, the first closing member 31a and the second closing member 31b may, for example, comprise a first and a second hollow body, respectively, wherein each of the two hollow bodies has an inner cavity 33 (see FIG. 9) which is limited by a deformable portion 35, wherein the two hollow bodies are arranged on opposite sides of the opening in such a way (see FIG. 8a) that the deformable portions face each other, and wherein each of the two hollow bodies is configured to be deformed outwards by an introduced pressure fluid at the deformable portion, thereby expanding the inner cavity, so that the two deformable portions may be moved toward each other and may be brought into contact with each other, to thereby close the opening (see FIG. 8b). As illustrated by FIG. 8b, each of the two closing members 31a, 31b partially covers the opening in this regard. Here, the at least one closing member 31a, 31b or at least the deformable portion thereof is, by way of example, made of a flexible elastic silicone material and comprises a sealing surface configured to seal at a counter surface in a closing state of the closing device. In this respect, the sealing surface is formed at the deformable portion. According to the embodiment shown, the counter surface is also formed by a deformable portion.

As illustrated by FIGS. 8a, 8b and 9, the deformable portion 35 may, for example, be inwardly curved with the opening being uncovered, and may curve outwardly by a pressure fluid supplied to the hollow body for closing the opening.

As suggested by FIGS. 8a and 8b, the closing device 31 may, for example, further comprise a fluid line structure F (broken line) through which the respective closing member 31a, 31b is in fluid connection with a pressure fluid source.

The fluid line structure F may, for example, be formed as a hose line structure, for example as a drag hose line structure, at least in sections. The hose line structure may comprise a first and a second hose line Fa and Fb, respectively, wherein the respective hose line may be connected to the associated closing member 31a, 31b for example at a front side thereof.

Here, the pressure fluid source comprises, by way of example, a compressed air vessel P which is, for example, formed as a stationary vessel, and a valve V which may, for example, be mounted on the fluid line F between the compressed air vessel P and the closing members.

As further suggested by FIGS. 8a and 8b, the closing device 31 may, for example, further comprise a control unit C which is configured to selectively close the opening by means of the at least one closing member 31a, 31b in a controlled way.

In this respect, the control unit is for example connected to the valve V and is configured to control it for closing the opening in such a way that the pressure fluid source feeds pressure fluid into the at least one hollow body 31a, so that it is deformed at its deformable portion 35 to thereby close the opening.

In FIG. 8a the valve is closed (and consequently the closing device is opened), whereas in FIG. 8b the valve is open (and consequently the closing device is closed).

The control unit C may, for example, be configured to close the closing device 31 if the construction job assigned to the coating device 3 is finished and/or interrupted, and/or to close the closing device 31 of the coating device 3 at least temporarily during a coating-free travel and/or during a coating-free travel phase, for example during an advance and/or follow-up travel phase, and/or close the closing device 31 of the coating device in a standstill position of the coating device 3, and/or close the closing device 31 of the coating device 3 at least temporarily for cleaning the coating device.

The deformable portions may, for example, be formed by the above-described lateral free portion of the respective closing member.

A closing member configured in such a way may, for example, also be referred to as an inflatable sealing member according to different embodiments.

It goes without saying that only one closing member 31a may be provided in an exemplary modification of the embodiment shown instead of the two closing members 31a and 31b, which one closing member 31 covers the opening entirely in the closed state of the closing device. Moreover, the closing device may, for example, as a further alternative comprise one or more sliders/sliding elements.

It should be noted that the coating device arrangement shown in FIG. 1 may comprise a separate closing device for each of the coating devices 3 and 5, so that the opening of a respective coating device can be closed independently and selectively.

In the case that the coating device 3 is provided together with the coating device 5, the coating device, the construction job of which is finished first, may be closed by means of its associated closing device, for example at least until the construction job of the other coating device is finished.

FIG. 11 shows a 3D printer 100 according to an embodiment of the invention, where the installation housing is not shown so that the installation frame 140 can be seen.

As shown by FIG. 11, the above-described coating device arrangement 1 may, for example, be employed in a 3D printer 100. In this context, reference number 103 shows a linear guiding structure for the at least one coating device 3.

The 3D printer 100 may, for example, comprise a printing device having a printing head 130 in addition to the coating device arrangement 1 (here by way of example comprising first and second coating devices 3, 5), which is configured to print a treatment agent on a predetermined partial area of a previously applied layer of construction material.

The print head 130 may, for example, be displaceable horizontally, for example in a direction perpendicular to the direction in which the at least one coating device 3, 5 is displaceable, for example along a first print head linear guiding structure 131.

In this respect, the print head 130 may for example be configured to serve several (here two) construction fields.

The print head 130 may, for example, be additionally displaceable in the direction in which also the at least one coating device 3, 5 is displaceable, so that it may travel across the construction field or the construction fields altogether in a meandering course, for example in the shape of a U. For this purpose, the print head 130 may, for example, be displaceable along a second print head linear guiding structure 132.

As an alternative to the printing device, a respective construction material layer may, for example, be solidified selectively, for example sintered using a laser (so-called "selective laser sintering").

As illustrated by FIG. 11 (also see FIG. 12), the 3D printer 100 may, for example, comprise one or more construction areas B1 and B2 (here for example two) which are for example defined by a respective construction platform 112 (see FIG. 12) and/or a respective construction box 110 and 120, respectively, if the latter is located within the 3D printer in its construction position.

The respective construction platform 112 may, for example, be height-adjustable using an associated lift drive (here exemplarily using an installation-fixed lift drive 114).

As shown, the first construction box 110 may be displaceable for example through a first roller conveyor 116 into and out of the 3D printer, and the second construction box 120 may be displaceable for example through a second roller conveyor 126 into and out of the 3D printer.

FIG. 12 shows the 3D printer 100 of FIG. 11, this time with a large part of the installation housing 150 and with an integrated coating device feeding unit 160.

As shown in FIG. 12, the 3D printer 100 may, for example, further comprise a coating device feeding unit 160 integrated in the 3D printer, by means of which construction material can be freshly prepared and fed into the (respective) coating device.

Two charging containers are illustrated, which store a respective particulate material and may feed the latter in a dosed manner into a mixing container having a stirring unit which cannot be seen.

A part of the installation housing 150 and of the first construction box 100 is omitted in FIG. 12 to make the construction platform 112 and the stack of construction material layers arranged thereon visible.

The coating devices 3, 5 are displaced backwards in FIG. 12, and the print head 130 is located in the front on the right-hand side.

FIG. 12 further shows how a first construction area B1 and a second construction area B2 are respectively formed by the first construction box and the second construction box.

Reference number 170 shows a common operating station.

Reference numbers 116 and 126 indicate a respective feeding device, here by way of example in the form of a roller conveyor, by means of which a respective construction box can be moved to its construction box construction position within the 3D printer.

FIGS. 13 and 14 show a plan view and a perspective view from above, respectively, of a 3D printer arrangement 200 which comprises a first and a second 3D printer 100 and 100', respectively.

Both 3D printers may, for example, be configured like the 3D printer 100 described with reference to FIGS. 11 and 12.

As illustrated by FIGS. 13 and 14, the first and second 3D printers 100, 100' may be arranged adjacent to each other in such a way that the introduction openings for introducing the construction boxes are opposite each other. A rail system 210 may for example extend between the 3D printers, along which a common transportation device 220 can be displaced. The transportation device 220 may be used both by the first and the second 3D printer 100, 100' to equip the respective 3D printer with one or more construction boxes.

In addition, one or more optional components may be arranged along the rail system, for example a construction box stock 230 in which one or more construction boxes are held available, and/or a microwave oven 240 which may receive a construction box to (further) solidify a component contained therein, and/or an unpacking station 250 where a component contained in the construction box can be freed from loose, unsolidified particulate material and thus can be "unpacked", for example in an automated manner. In this context, reference number 260 indicates an optional component stock into which unpacked components (here for example casting molds and/or foundry cores) manufactured by means of a generative manufacturing process using one of the two 3D printers can be placed into storage.

FIGS. 15a to 15c show different views of a coating device arrangement 1 for a 3D printer according to another embodiment.

As shown, the coating device arrangement 1 may comprise: a coating device 3 having a container 17 defining an inner cavity for receiving particulate construction material PM which leads to an opening for outputting the particulate construction material, and at least one (here exemplarily two) stroking member 15a, 15b, by which a downward oriented stroking surface is formed and which is configured to stroke construction material output from the opening using the stroking surface, to thereby level and/or compress the output particulate material, and a setting device 13 configured to variably set an inclination angle α of the (respective) stroking surface.

It should be understood that the coating device arrangement 1, here exemplarily configured as a bidirectional coating device arrangement, may alternatively be formed as a unidirectional coating device arrangement.

As shown, the setting device 13 may, for example, comprise a drive 13a by means of which the inclination angle α of the (respective) stroking surface can be changed. Here, the drive is exemplarily configured as a hydraulic linear drive. It goes without saying that an alternative drive may be used as well.

As shown, the setting device 13 may for example further comprise a limit stop structure having at least one limit stop 13b which is configured to limit a movement generated by the drive 13a (here, by way of example, coating device pivot movement) to a particular degree to hereby set the inclination angle α of the (respective) stroking surface. The limit stop 13b may be adjusted variably, so that the inclination angle α of the stroking surface is variably adjustable by adjusting the limit stop. The limit stop 13b may, for example, be electrically adjustable. It goes without saying that the drive 13b may for example alternatively be configured to adjust the inclination angle α of the (respective) stroking surface directly by means of the drive itself.

According to the embodiment shown, the setting device is, by way of example, formed as a pivot device configured to pivot the coating device 3 to thereby pivot the (respective) stroking member 15a and hereby to set the inclination angle α of the stroking surface. It goes without saying that alternatively, for example, only the (respective) stroking member 15a may be pivoted to thereby set the (associated) inclination angle (α) of the stroking surface.

As illustrated by FIGS. 15b and 15c, the coating device 3 according to the present embodiment is configured as a pivotable coating device. As shown by FIG. 15a, the coating device arrangement 1 may for this purpose for example further comprise at least one bearing block 11 by which the coating device 3 is pivotably supported, for example by means of a pivot pin 12. As further illustrated by FIG. 15a, the coating device arrangement 1 may further comprise for example at least one linear guide structure 103, along which the coating device 3 can be displaced together with the bearing block 11 along the double arrow. As further illustrated by FIG. 15*a*, the coating device arrangement 1 may, for example be displaceable across a construction space B1, which is here exemplarily defined by a construction box 110. Alternatively, the construction space may of course be defined (only) by a construction platform above the same.

As shown by FIG. 15*b*, the coating device arrangement 1 may for example comprise an optional closing device 31 for selectively closing the opening in a controlled way.

As further illustrated by FIG. 15*b*, the at least one stroking member 15*a*, 15*b* may, for example, be co-formed by the container, for example by a portion thereof projecting downward and extending below the opening. It goes without saying that the at least one stroking member 15*a*, 15*b* may alternatively be formed by a separate member.

As further illustrated by FIG. 15*a*, the coating device arrangement 1 may, for example, further comprise a control unit C which is connected to the setting device 13, for example to the drive 13*a* and/or the limit stop 13*b*.

The control unit is configured to control the setting device 13 in such a manner that the latter sets/adjusts the (respective) inclination angle $\alpha$ for levelling and/or compressing the output construction material, for example sets and/or readjusts the inclination angle $\alpha$ to a (respective) initial value, for example during a construction job.

As suggested by FIG. 15*a*, for example several different parameters or sets of parameters P1 to P15 may be stored in the control unit C, the sets of parameters shown being respectively characterized by a particulate material composition used and/or one or more ambient conditions and/or a desired compression degree. For example, the set of parameters P1 may represent a first particulate material composition, which shall be used to apply layers having a first desired degree of compression (for example "high" degree of compression) in the case of particular ambient conditions. For example, the set of parameters P2 may represent the first particulate material composition, by means of which layers having a second desired degree of compression (for example "low" degree of compression) are to be applied in the case of particular ambient conditions. For example, the set of parameters P3 may represent a second particulate material composition, by means of which layers having a first desired degree of compression are to be applied in the case of particular ambient conditions, etc. A user may, for example, indicate a respective value or make a respective choice at an operator station with respect to the particulate material composition and/or the one or more ambient conditions and/or the desired degree of compression, whereupon the controller C selects an associated parameter or set of parameters. Then, the control unit C may set the (respective) inclination angle $\alpha$ according to the particulate material composition and/or the one or more ambient conditions and/or the desired degree of compression to an initial value based on the selected set of parameters.

As further suggested by FIG. 15*a*, the control unit C may for example optionally be supplied with a current/actual inclination angle $\alpha$ which is detected by an inclination sensor not shown. In this respect, the control unit may further be configured to set the inclination angle $\alpha$ based on the value detected by the inclination sensor, for example at least initially (for example by control and/or regulation). Thereby, the inclination angle can be set accurately, and a setting error which is for example due to wear and tear and/or temperature variations can be detected by the controller. The inclination angle sensor may, for example, comprise one or more acceleration sensors. In FIG. 7, an inclination angle sensor S$\alpha$ is attached to the carrier structure by way of example. It shall be understood that the inclination angle sensor S$\alpha$ may also be configured in another way and/or may be placed at another location, for example on the stroking member itself.

As further suggested by FIG. 15*a*, the control unit C may, for example, optionally be fed with a current density value $\rho$ (relating to the density and the degree of compression of an applied layer, respectively) which is detected by a density sensor not shown. In this respect, the control unit may further be configured to set, for example to readjust the inclination angle $\alpha$ based on the value detected by the density sensor (for example by control and/or regulation). Thereby, it is for example possible for the control to avoid or at least detect that there is a changed degree of compression due to a disturbance value (for example a changed grain size of a construction material mixture), so that potentially a defective component is manufactured. Then, the control may output an alarm and/or interrupt the construction job and/or conduct a density regulation or density control, for example to approximate the (deviating) density value to a set value by changing the inclination angle. The density sensor may, for example, comprise one or more optical sensors which scan an applied layer in at least partial areas thereof optically, to therefrom draw conclusions as to the density degree of the layer. In FIG. 7, such an optical sensor S$\rho$ is, for example, attached to the carrier structure of the coating device. The density sensor S$\alpha$ may of course be configured in another way and/or may be placed at another location, for example on the stroking member or on the bearing block.

The density sensor and the inclination angle sensor may, for example, be provided together or, for example, only one of the two sensors may be provided. According to a simple embodiment, it is also possible that none of the two sensors is provided. In this case, a respective set of parameters may, for example, only comprise a drive parameter, for example a rotation angle of a rotary drive.

It should be noted that one or more of the sets of parameters may also cause a willful variation of the compression degree during a construction job, for example to manufacture a component having different zones of rigidity.

As shown by FIGS. 15*b* and 15*c*, the coating device 3 may, for example, be formed as a bidirectional coating device which is configured to output construction material on a journey and a return journey of the coating device, wherein the coating device 3 comprises a stroking member 15*a*, 15*b* on two opposite sides of the opening, so that particulate construction material output from the opening during the journey (FIG. 15*c*) can be stroked using a first stroking member 15*a*, and particulate construction material output from the opening during the return journey (FIG. 15*b*) can be stroked using a second stroking member 15*b*, and wherein the setting device 13 is configured to set the inclination angle $\alpha$ of the stroking surface of the first stroking member 15*a* for a leveling and/or compression of the output particulate construction material for the journey and to set the inclination angle $\alpha$ of the stroking surface of the second stroking member 15*b* for a leveling and/or compression of the output particulate construction material for the return journey.

In this context, the setting device 13 is controlled by the control unit C in such a way that it pivots the coating device 3 in a first direction (here to the left) for the journey to thereby set the inclination angle $\alpha$ of the stroking surface of the first stroking member 15*a* for a leveling and/or compression of the output particulate construction material, and to pivot the coating device 3 in a second direction opposed to the first direction (here to the right) for the return journey, to thereby set the inclination angle α of the stroking surface of the second stroking member 15b for a leveling and/or compression of the output particulate construction material.

As in addition shown by FIGS. 15b and 15c, the following may apply in a method for applying two layers of particulate construction material:

a coating device 3 including a container 17 having an inner cavity which is filled with particulate construction material PM and leads to an opening for outputting the particulate construction material is moved in a first direction across a construction field to form a first layer of construction material during a first travel (see FIG. 15c), the particulate construction material output from the opening during the first travel is stroked using a first stroking member 15a by which a stroking surface is formed, facing the construction field, to level and/or to compress the output particulate material using the stroking surface, the coating device 3 is moved in a second direction across the construction field (see FIG. 15b) to form a second layer of construction material during a second travel, the particulate construction material output from the opening during the second travel is stroked using a second stroking member 15b by which a stroking surface is formed, facing the construction field, to level and/or compress the output particulate material using the stroking surface, the coating device 3 is pivoted in a first direction for the first travel to thereby set the inclination angle α of the stroking surface of the first stroking member 15a for a leveling and/or compression of the output particulate construction material, and the coating device 3 is pivoted in a second direction for the second travel to thereby set the inclination angle α of the stroking surface of the second stroking member 15b for a leveling and/or compression of the output particulate construction material.

FIGS. 16a to 16d show coating device arrangements according to different embodiments.

Figure 16B:
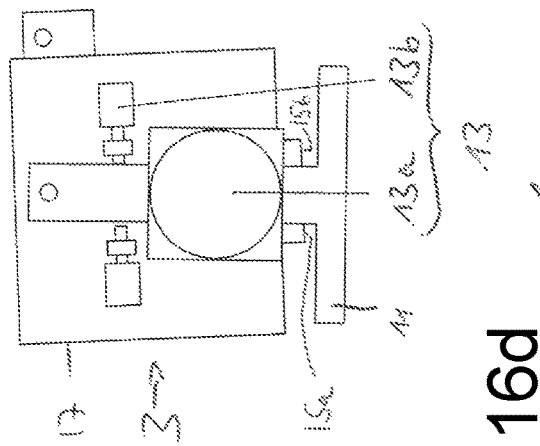
Figure 16A:
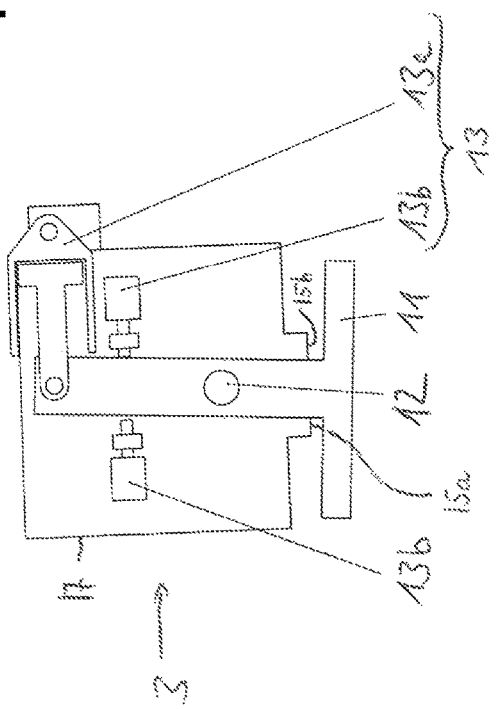

The coating device arrangement shown in FIG. 16a is configured in a similar way as the coating device arrangement shown in FIG. 15a, which is why no detailed description will be made thereof. As shown, a coating device arrangement 1 according to this embodiment may comprise a "container coating device" 3 (for example "slot coating device") comprising one or more stroking members 15a, 15b. The coating device arrangement 1 further comprises a setting device 13 which is configured to variably set an inclination angle of the (respective) stroking surface. Here, the setting device 13 by way of example comprises a linear drive 13a (for example a hydraulic linear drive) and a limit stop structure having at least one limit stop 13b. The limit stop 13b and thus the inclination angle may be set manually or by means of an electric drive.

FIG. 16b shows a coating device arrangement according to another embodiment. As shown, a coating device arrangement 1 according to this embodiment may, for example, comprise a "container coating device" 3 (for example a "slot coating device") comprising one or more stroking members 15a, 15b. The coating device arrangement 1 further comprises a setting device 13 which is configured to variably set an inclination angle of the (respective) stroking surface. Here, the setting device 13 by way of example comprises a pivot drive which outputs a torque, and a limit stop structure having at least one limit stop 13b. The limit stop 13b and thus the inclination angle may be set manually or by means of an electric drive.

Figure 16D:
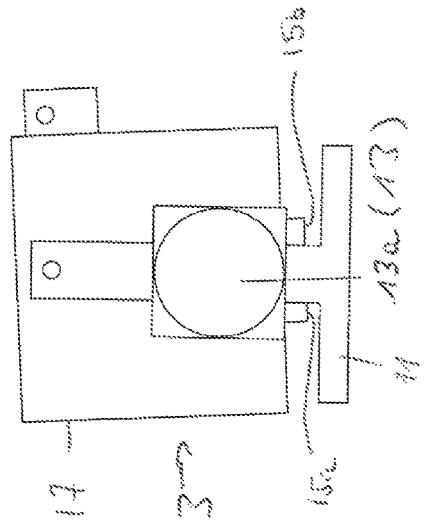
Figure 16C:
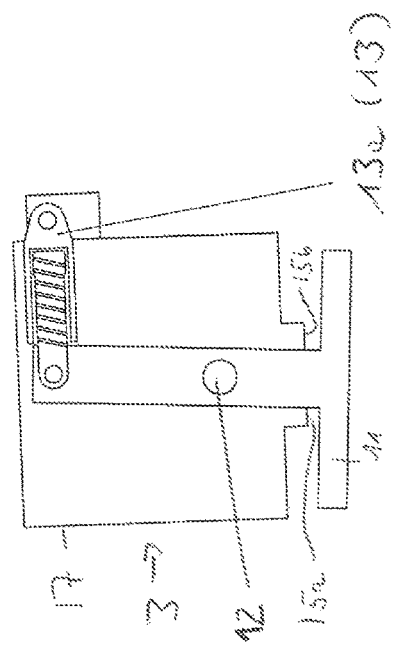

FIG. 16c shows a coating device arrangement according to another embodiment. As shown, a coating device arrangement 1 according to this embodiment may, for example, comprise a "container coating device" 3 (for example a "slot coating device") comprising one or more stroking members 15a, 15b. The coating device arrangement 1 further comprises a setting device 13 which is configured to variably set an inclination angle of the (respective) stroking surface. Here, the setting device 13 exemplarily comprises a linear drive 13a (for example an electric linear drive). There is no need for a limit stop structure according to this embodiment. According to this embodiment, the inclination angle may be set directly by means of the drive 13a.

FIG. 16d shows a coating device arrangement according to another embodiment. As shown, a coating device arrangement 1 according to this embodiment may, for example, comprise a "container coating device" 3 (for example a "slot coating device") comprising one or more stroking members 15a, 15b. The coating device arrangement 1 further comprises a setting device 13 which is configured to variably set an inclination angle of the (respective) stroking surface. Here, the setting device 13 comprises by way of example a pivot drive 13a (for example an electric pivot drive). There is no need for a limit stop structure according to this embodiment. According to this embodiment, the inclination angle may be set directly by means of the drive 13a.

As shown, the coating device 3 may, for example, be provided as a pivotable coating device in each of the described embodiments. For this purpose, the coating device 3 may, for example on at least one of its front sides be attached to a bearing block 11 in a pivoting way, for example using a pivot pin 12.

Thus, the setting device 13 may be provided as a pivoting device in each of the four embodiments described, which is configured to pivot the coating device 3 to thereby pivot the at least one stroking member 15a and hereby set the inclination angle of the stroking surface.

In each of the four embodiments described, the coating device arrangement 1 may, for example, comprise a linear guide structure (not shown), along which the coating device 3 and/or the bearing block 11 are displaceable, for example from left to right in FIGS. 16 to 16d.

In each of the four embodiments described, the coating device arrangement 1 may further comprise a control unit as described in the claims.

The invention claimed is:

1. A coating device arrangement for a 3D printer, comprising:
   a coating device having a container defining an inner cavity for receiving particulate construction material (PM) which leads to an opening for outputting the particulate construction material, and a stroking member, by which a downward oriented stroking surface is formed and which is configured to stroke over construction material output from the opening using the stroking surface, to thereby level and/or compress the output particulate material,
   characterized by
   a setting device configured to variably set an inclination angle (α) of the stroking surface.

2. A coating device arrangement according to claim 1, wherein the setting device comprises a drive by which the inclination angle (α) of the stroking surface is modifiable.

3. A coating device arrangement according to claim 2, wherein the drive (13a) is a linear drive or a pivot or rotary drive.

4. A coating device arrangement according to claim 2, wherein the drive is chosen from the group consisting of a hydraulic drive, a pneumatic drive, an electric drive and combinations thereof.

5. A coating device arrangement according to claim 2, wherein the drive is configured to variably set the inclination angle ($\alpha$) of the stroking surface directly using the drive itself.

6. A coating device arrangement according to claim 2, wherein the setting device further comprises a limit stop configured to limit a movement generated by the drive to a particular degree to thereby set the inclination angle ($\alpha$) of the stroking surface.

7. A coating device arrangement according to claim 6, wherein the limit stop is variably adjustable, so that the inclination angle ($\alpha$) of the stroking surface is variably adjustable by adjusting the limit stop.

8. A coating device arrangement according to claim 7, wherein the limit stop is electrically adjustable.

9. A coating device arrangement according to claim 1, wherein the setting device is formed as a pivot device which is configured to pivot the stroking member to thereby set the inclination angle ($\alpha$) of the stroking surface.

10. A coating device arrangement according to claim 1, further comprising a bearing block at which the coating device is pivotably supported.

11. A coating device arrangement according to claim 1, further comprising a control unit (C) which is connected to the setting device to the drive and/or to the limit stop, and which is configured to control the setting device in such a manner that the latter sets or adjusts the inclination angle ($\alpha$).

12. A coating device arrangement according to claim 11, wherein the control unit (C) is configured to set the inclination angle ($\alpha$) according to a used particulate material composition and/or one or more ambient conditions and/or a desired degree of compression to an initial value based on a respectively associated parameter or set of parameters stored in the control unit.

13. A coating device arrangement according to claim 1, further comprising an inclination sensor ($S\alpha$) which is configured to measure a value which is representative of the current inclination angle ($\alpha$) of the stroking surface.

14. A coating device arrangement according to claim 13, wherein the inclination sensor ($S\alpha$) is connected to a control unit (C) which is connected to the setting device, and wherein the control unit is further configured to set the inclination angle ($\alpha$) based on the value measured by the inclination sensor to set and/or readjust the inclination angle ($\alpha$) to an initial value.

15. A coating device arrangement according to claim 1, further comprising a density sensor ($S\rho$) which is configured to measure a value which is representative of the density of an applied layer.

16. A coating device arrangement according to claim 15, wherein the density sensor ($S\rho$) is connected to a control unit (C) which is connected to the setting device, and wherein the control unit is further configured to set the inclination angle ($\alpha$) based on the value measured by the density sensor ($S\rho$) to regulate the density to a desired value and/or to change a desired value of the inclination angle depending on the measured density value and/or to reduce a disturbance value.

17. A coating device arrangement according to claim 1, wherein the coating device is formed as a bidirectional coating device configured to output construction material on a journey and on a return journey of the coating device, the coating device comprises the stroking member on each of two opposite sides of the opening, so that particulate construction material output from the opening during the journey can be stroked using a first one of the stroking members, and particulate construction material output from the opening during the return journey can be stroked using a second one of the stroking members, and the setting device is configured to set the inclination angle ($\alpha$) of the stroking surface of the first stroking member for a leveling and/or compression of the output particulate construction material for the journey, and to set the inclination angle ($\alpha$) of the stroking surface of the second stroking member for a leveling and/or compression of the output particulate construction material for the return journey.

18. A coating device arrangement according to claim 17, wherein the setting device is configured to adjust the inclination angle ($\alpha$) of the stroking surface of the first stroking member and the inclination angle ($\alpha$) of the stroking surface of the second stroking member together.

19. A coating device arrangement according to claim 17, wherein the setting device is configured to pivot the coating device in a first direction for the journey, to thereby set the inclination angle ($\alpha$) of the stroking surface of the first stroking member for a leveling and/or compression of the output particulate construction material, and to pivot the coating device in a second direction opposite to the first direction for the return journey, to thereby set the inclination angle ($\alpha$) of the stroking surface of the second stroking member for a leveling and/or compression of the output particulate construction material.

20. A 3D printer, comprising a coating device arrangement, the coating device arrangement having a coating device having a container defining an inner cavity for receiving particulate construction material (PM) which leads to an opening for outputting the particulate construction material, and a stroking member by which a downward oriented stroking surface is formed and which is configured to stroke over construction material output from the opening using the stroking surface, to thereby level and/or compress the output particulate material, characterized by a setting device configured to variably set an inclination angle ($\alpha$) of the stroking surface.

* * * * *